(12) United States Patent
Hasumi et al.

(10) Patent No.: US 7,827,098 B2
(45) Date of Patent: Nov. 2, 2010

(54) CREDIT INTERMEDIARY SYSTEM, CREDIT INTERMEDIARY APPARATUS AND METHOD THEREOF, RECORDING MEDIUM AND PROGRAM

(75) Inventors: Yoshitsugu Hasumi, Saitama (JP); Keiji Shiotani, Chiba (JP)

(73) Assignee: Sony Corporation, Tokyo (JP)

( * ) Notice: Subject to any disclaimer, the term of this patent is extended or adjusted under 35 U.S.C. 154(b) by 1537 days.

(21) Appl. No.: 10/259,294

(22) Filed: Sep. 30, 2002

(65) Prior Publication Data
US 2004/0064403 A1    Apr. 1, 2004

(51) Int. Cl.
G06Q 40/00 (2006.01)
(52) U.S. Cl. .......................................... 705/38; 705/39
(58) Field of Classification Search .................... 705/39
See application file for complete search history.

(56) References Cited

U.S. PATENT DOCUMENTS

| | | | |
|---|---|---|---|
| 5,546,471 A * | 8/1996 | Merjanian | 382/124 |
| 6,098,053 A * | 8/2000 | Slater | 705/44 |
| 6,108,642 A * | 8/2000 | Findley | 705/44 |
| 6,792,334 B2 * | 9/2004 | Metcalf et al. | 700/237 |
| 6,907,408 B2 * | 6/2005 | Angel | 705/64 |
| 6,999,936 B2 * | 2/2006 | Sehr | 705/5 |
| 2001/0026632 A1 * | 10/2001 | Tamai | 382/116 |
| 2002/0169720 A1 * | 11/2002 | Wilson et al. | 705/44 |
| 2002/0178369 A1 * | 11/2002 | Black | 713/186 |
| 2003/0220835 A1 * | 11/2003 | Barnes, Jr. | 705/14 |

FOREIGN PATENT DOCUMENTS

| | | |
|---|---|---|
| JP | 07-046323 | 2/1995 |
| JP | 07-319963 | 12/1995 |
| JP | 11-215255 | 8/1999 |
| JP | 2000-293590 | 10/2000 |

OTHER PUBLICATIONS

Visa Industry Report, *Visa Secure Commerce Program*, Nov. 1, 2000, pp. 1-3.

* cited by examiner

*Primary Examiner*—Stefanos Karmis
*Assistant Examiner*—Jessica L Lemieux
(74) *Attorney, Agent, or Firm*—Oblon, Spivak, McClelland, Maier & Neustadt, L.L.P.

(57) ABSTRACT

An affiliated store terminal obtains a security code and a card holder's attribution information of a credit card, such as a card holder's attribution information consists of a date of birth, lower four figures of a home telephone number, a last name and a first name of a card holder. An authorization request transmitted from the affiliated terminal is transmitted to a card company apparatus, and further transmitted to a card issuing company apparatus through an intermediary center apparatus. The card company apparatus executes an authorization process and return a result of the authorization process to the affiliated store terminal through the intermediary center apparatus and the previous card company apparatus.

9 Claims, 24 Drawing Sheets

FIG. 15

STORE TABLE

|  | HUNDRED THOUSAND YEN OR ABOVE | TEN THOUSAND YEN OR ABOVE | TWO THOUSAND YEN OR ABOVE | BELOW TWO THOUSAND YEN |
|---|---|---|---|---|
| DATE OF BIRTH | ◯ |  | ◯ |  |
| TELEPHONE NUMBER | ◯ |  |  |  |
| NAME IN KATAKANA (LAST NAME) | ◯ | ◯ |  |  |
| NAME IN KATAKANA (FIRST NAME) | ◯ |  |  |  |
| SECURITY CODE | ◯ | ◯ |  |  |

FIG. 16

INTERMEDIARY CENTER DATA BASE

| CARD COMPANY MASTER |
|---|
| D/E-SCOTT CONNECTION COMPANY MASTER |

FIG. 17

CARD COMPANY MASTER

| ISSUER | CARD COMPANY NAME |
|--------|-------------------|
| 123456 | A |
| 555555 | B |
| 987654 | C |

FIG. 18

D/e-SCOTT MASTER

| ISSUER | IP ADDRESS | AFFILIATED STORE COMPANY CODE |
|--------|------------|-------------------------------|
| 123456 | 211.239.101.201 | 35210025561 |
| 555555 | 109.255.0.0 | 411657733445 |
| 987654 | 233.255.200.200 | 255561000111 |

FIG. 20

FIELD DEFINITION

| TAG | LENGTH | ITEM | NUMBER OF DIGITS | EXPLANATION OF ITEM | REMARKS |
|---|---|---|---|---|---|
| S01 | 46 | SECURITY CODE | 4 | CHECK CODE FOR USER IDENTIFICATION TO BE DISPLAYED ON FACE OF CARD, SPACE AFTER LEFT-JUSTIFICATION | INITIAL VALUE: SPACE |
| | | DATE OF BIRTH | 4 | DATE OF BIRTH OF USER (EXCEPT FOR YEAR) | INITIAL VALUE: SPACE |
| | | HOME TELEPHONE NUMBER | 4 | HOME TELEPHONE NUMBER OF USER (LOWER FOUR DIGITS) | INITIAL VALUE: SPACE |
| | | NAME IN KATAKANA (LAST NAME) | 15 | LAST NAME OF USER (NO CONTRACTED SOUND), SPACE AFTER LEFT-JUSTIFICATION | INITIAL VALUE: SPACE |
| | | NAME IN KATAKANA (FIRST NAME) | 15 | FIRST NAME OF USER (NO CONTRACTED SOUND), SPACE AFTER LEFT-JUSTIFICATION | INITIAL VALUE: SPACE |
| | | MATCHING RESULT (1) | 1 | MATCHING RESULT OF DATE OF BIRTH | INITIAL VALUE: SPACE |
| | | MATCHING RESULT (2) | 1 | MATCHING RESULT OF HOME TELEPHONE NUMBER | INITIAL VALUE: SPACE |
| | | MATCHING RESULT (3) | 1 | MATCHING RESULT OF NAME IN KATAKANA (LAST NAME) | INITIAL VALUE: SPACE |
| | | MATCHING RESULT (4) | 1 | MATCHING RESULT OF NAME IN KATAKANA (FIRST NAME) | INITIAL VALUE: SPACE |

FIG. 21

| SET VALUE | CONTENT | MEANING |
|---|---|---|
| 0 | MATCHED | MATCHED TO INPUTTED CONTENT |
| 1 | UNMATCHED | UNMATCHED TO INPUTTED CONTENT |
| 8 | NOT APPLICABLE FOR MATCHING | NO MATCHING BECAUSE SPACE IS SET |
| 9 | MATCHING IS NOT AVAILABLE | · MATCHING IS NOT AVAILABLE BECAUSE OF AFFILIATED CARD, CORPORATE CARD AND OTHER COMPANY'S CARD OR THE LIKE<br>· MATCHING UNAVAILABLE ITEM |
| SPACE | INITIAL VALUE | |

F I G. 22

<AUTHORIZATION>

| TAG | LENGTH | ITEM | NUMBER OF DIGITS | INTERMEDIARY CENTER APPARATUS→ CARD COMPANY APPARATUS | CARD COMPANY APPARATUS→ INTERMEDIARY CENTER APPARATUS |
|---|---|---|---|---|---|
| S01 | 46 | SECURITY CODE | 4 | IN THE CASE OF NO INPUT, SPACE | GUARANTEE CONTENTS OF ELECTRONIC MESSAGE REQUEST |
| | | DATE OF BIRTH | 4 | IN THE CASE OF NO INPUT, SPACE | GUARANTEE CONTENTS OF ELECTRONIC MESSAGE REQUEST |
| | | HOME TELEPHONE NUMBER | 4 | IN THE CASE OF NO INPUT, SPACE | GUARANTEE CONTENTS OF ELECTRONIC MESSAGE REQUEST |
| | | NAME IN KATAKANA (LAST NAME) | 15 | IN THE CASE OF NO INPUT, SPACE | GUARANTEE CONTENTS OF ELECTRONIC MESSAGE REQUEST |
| | | NAME IN KATAKANA (FIRST NAME) | 15 | IN THE CASE OF NO INPUT, SPACE | GUARANTEE CONTENTS OF ELECTRONIC MESSAGE REQUEST |
| | | MATCHING RESULT (1) | 1 | SPACE | SET MATCHING RESULT |
| | | MATCHING RESULT (2) | 1 | SPACE | SET MATCHING RESULT |
| | | MATCHING RESULT (3) | 1 | SPACE | SET MATCHING RESULT |
| | | MATCHING RESULT (4) | 1 | SPACE | SET MATCHING RESULT |

◎ IN THE CASE OF SALES REFUSAL, SPACES ARE SET IN MATCHING RESULTS (1) TO (4)

FIG. 23

<AUTHORIZATION IS CANCELLED>

| TAG | LENGTH | ITEM | NUMBER OF DIGITS | INTERMEDIARY CENTER APPARATUS→ CARD COMPANY APPARATUS | CARD COMPANY APPARATUS→ INTERMEDIARY CENTER APPARATUS |
|---|---|---|---|---|---|
| S01 | 46 | SECURITY CODE | 4 | SPACE | GUARANTEE CONTENTS OF ELECTRONIC MESSAGE REQUEST |
| | | DATE OF BIRTH | 4 | SPACE | GUARANTEE CONTENTS OF ELECTRONIC MESSAGE REQUEST |
| | | HOME TELEPHONE NUMBER | 4 | SPACE | GUARANTEE CONTENTS OF ELECTRONIC MESSAGE REQUEST |
| | | NAME IN KATAKANA (LAST NAME) | 15 | SPACE | GUARANTEE CONTENTS OF ELECTRONIC MESSAGE REQUEST |
| | | NAME IN KATAKANA (FIRST NAME) | 15 | SPACE | GUARANTEE CONTENTS OF ELECTRONIC MESSAGE REQUEST |
| | | MATCHING RESULT (1) | 1 | SPACE | SPACE |
| | | MATCHING RESULT (2) | 1 | SPACE | SPACE |
| | | MATCHING RESULT (3) | 1 | SPACE | SPACE |
| | | MATCHING RESULT (4) | 1 | SPACE | SPACE |

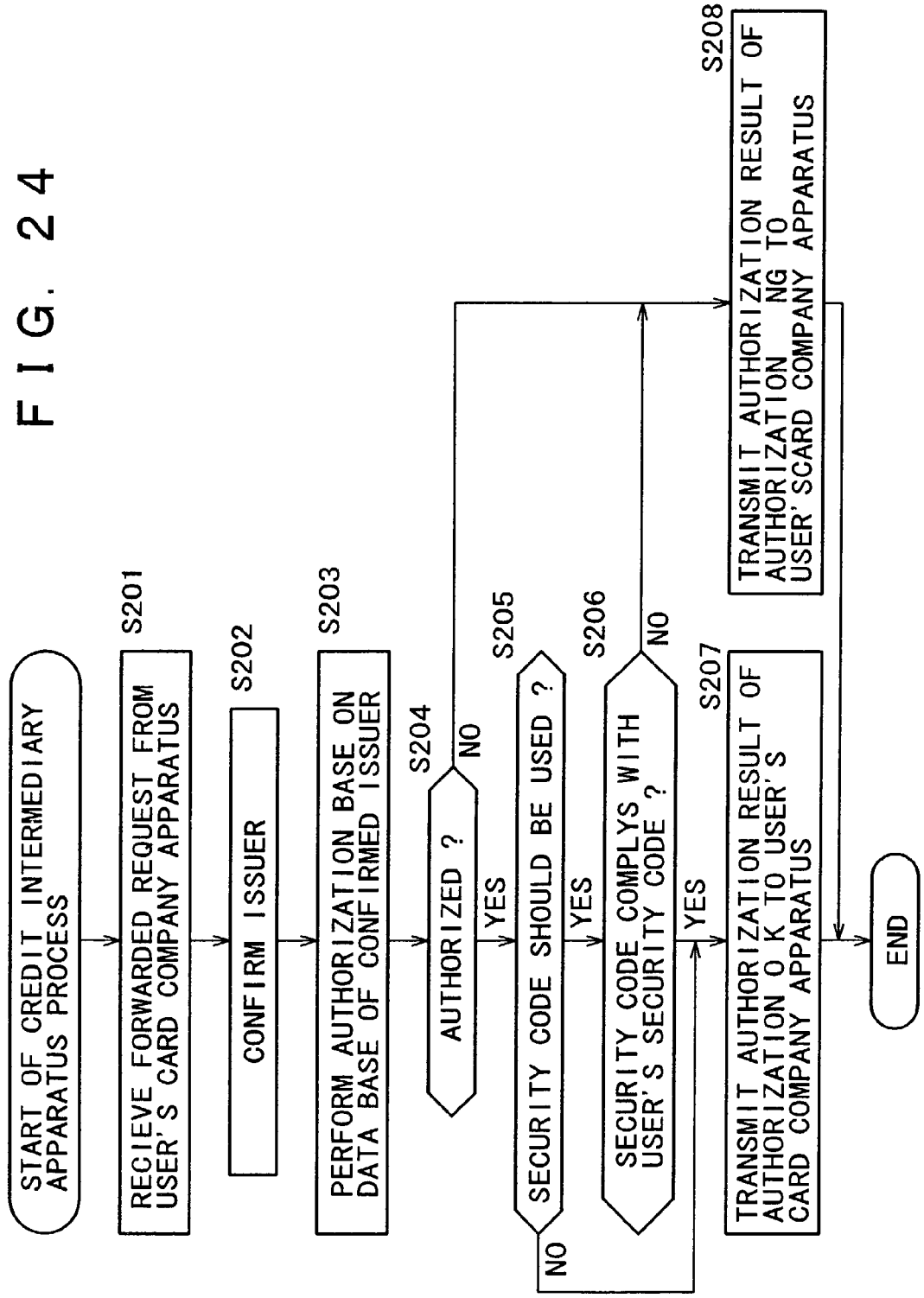

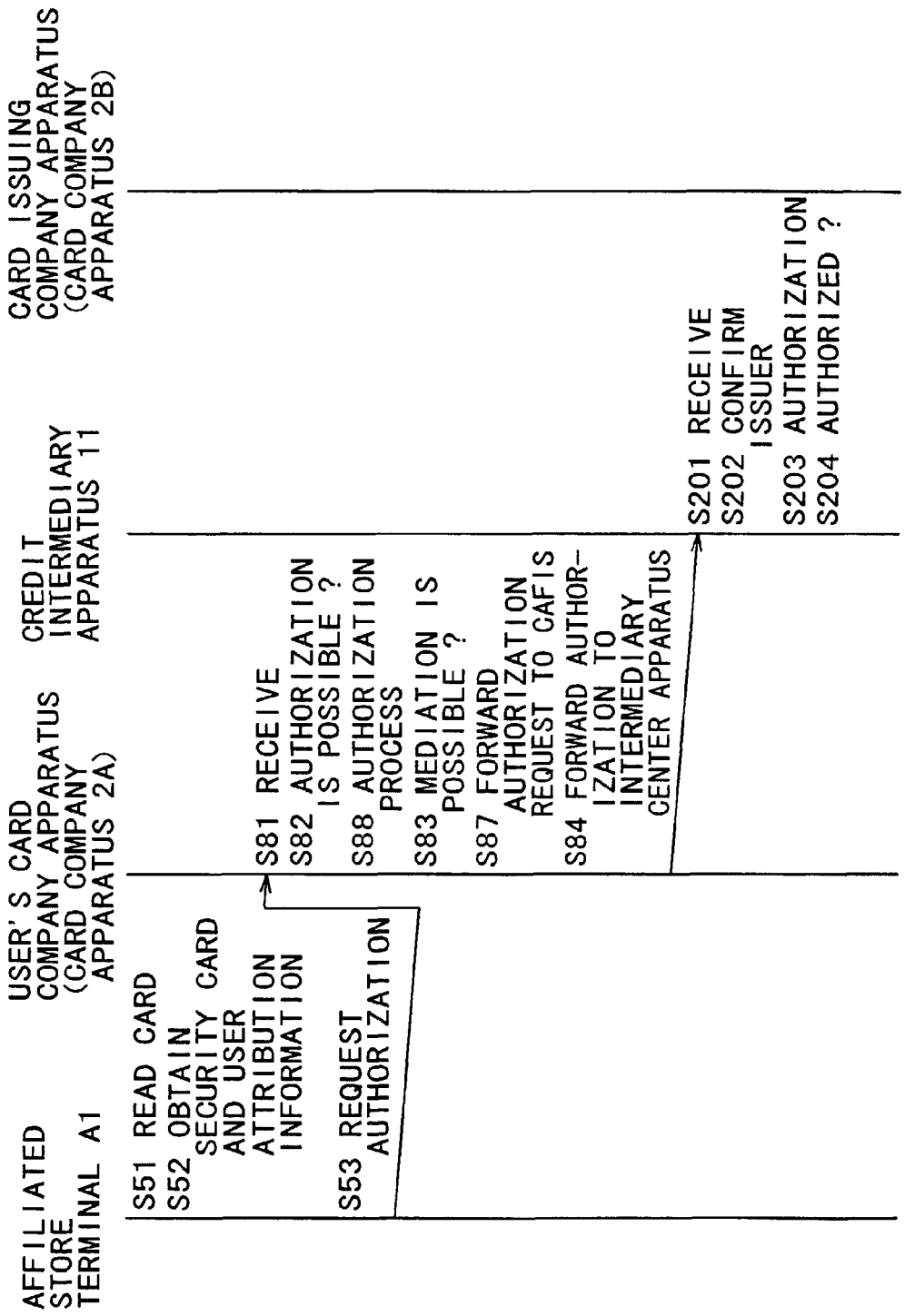

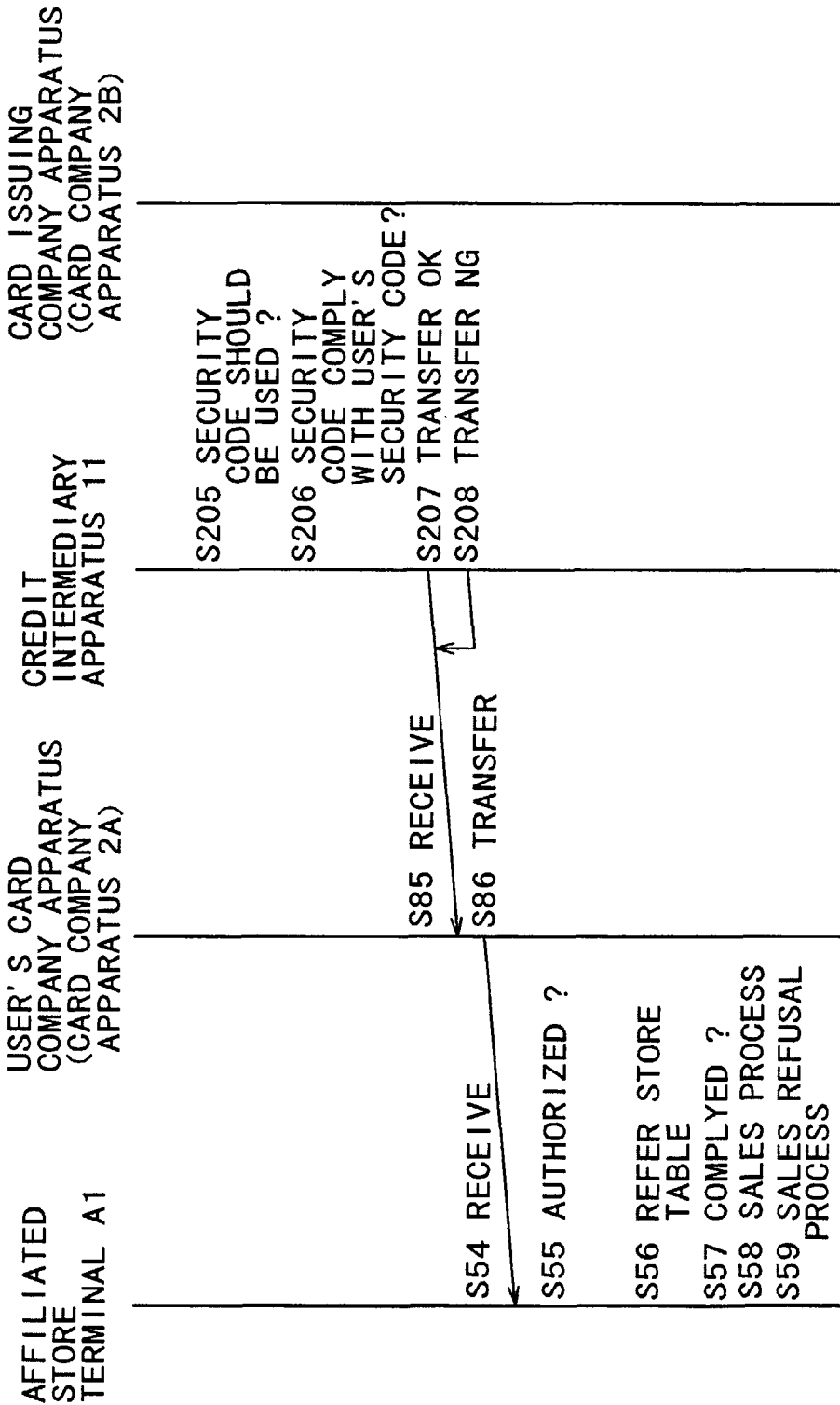

CREDIT INTERMEDIARY SYSTEM, CREDIT INTERMEDIARY APPARATUS AND METHOD THEREOF, RECORDING MEDIUM AND PROGRAM

BACKGROUND OF THE INVENTION

1. Field of the Invention

The present invention relates to a credit intermediary system, a credit intermediary apparatus and a method thereof, a recording medium and a program. More particularly, the present invention relates to a credit intermediary system, a credit intermediary apparatus and a method thereof, a recording medium and a program that enable a credit card company to easily perform crediting process.

2. Description of Related Art

FIG. 1 shows a configuration example of an information processing system adapted for using a credit card in related art. According to this configuration example, terminals A1 to A3 of affiliated stores of a company A which issued credit cards are disposed in predetermined stores. In the same way, affiliated store terminals B1 to B3 of a company B and affiliated store terminals C1 to C3 of a company C are disposed in predetermined stores, respectively.

These affiliated store terminals A1 to C3 are connected to a CAFIS (Credit And Finance Information System) 1 through a network 3.

Card company apparatuses 2A to 2C, which are administrated by the company A, the B company and the company C, are also connected to the CAFIS 1 through the network 3.

Next, processes of the system shown in FIG. 1 are explained with reference to flow charts shown in FIG. 2 to FIG. 6 below. FIG. 2 shows processes of the affiliated store terminals A1 to C3, FIG. 3 shows process of a card company apparatus corresponding to the affiliated store, to which a user shows an intention to use a credit card, (i.e., a user's card company apparatus) among the card company apparatuses 2A to 2C, FIG. 4 shows process of the CAFIS 1 and FIG. 5 shows process of the card company apparatus (i.e. a card issuing company apparatus), which issued the credit card to the user.

Additionally, FIG. 6 shows a relation of the processes of these affiliated store terminals, the user's card company apparatus, the CAFIS and the card issuing company apparatus.

At the beginning, with reference to the flow charts shown in FIG. 2 and FIG. 6, the process of the affiliated store terminal is explained below. As a matter of convenience for the explanation, it is assumed that at the present moment, the user uses a credit card, which is issued by the company B and is also capable of being used with the affiliated store terminal of the company A, at the store in which the affiliated store terminal A1 is placed.

If the user intends to purchase a commodity by the use of one's own credit card at the store in which the affiliated store terminal A1 is placed, the affiliated store terminal A1 reads a card number, an expiration date and an issuer from the credit card of this user in step S1. In step S2, the affiliated store terminal A1 sends a request for a authorization to the user's card company (in this case, the card company apparatus 2A of the company A administrating the affiliated store terminal A1) through the network 3. The authorization request is sent with the card number, the expiration date and the issuer, which are read in the process of the step S1.

After requesting the authorization as described above, a result of the authorization (authorization result) is transmitted from the card company apparatus 2A, which is one of the user's card company apparatuses (step S15 in FIG. 3 and FIG. 6). The details of an authorization process will be described later.

In step S3, the store terminal A1 receives the authorization result, which has been transmitted from the card company apparatus 2A.

Further, in step S4, the store terminal A1 determines whether or not the authorization result, which has been received in the process of the step S3, indicates that the transaction by the user's credit card is authorized (authorization OK). If the authorization result is the authorization OK, the process proceeds to step S5 and the store terminal A1 carries out procedures to complete a sale transaction (sales process). If the authorization result is not the authorization OK (i.e., in the case of authorization NG), the process proceeds to step S6 and the store terminal A1 carries out procedures to refuse a sale transaction (sales refusal process).

Next, with reference to the flow charts in FIG. 3 and FIG. 6, the processing of the store terminal A2, which is one of user's card company apparatuses, is explained.

In step S11, the card company apparatus 2A receives the request from the store terminal A1. This request is transmitted in the step S2 shown in FIG. 2 and FIG. 6.

In step S12, the card company apparatus 2A determines whether or not the card company has authority to perform the authorization on the basis of this request. Typically, the card apparatus of the company that has issued the credit card only has such authority. Accordingly, for example, in the case that the authorization of the credit card issued by the company A is requested, the process proceeds to step S16 and the card company apparatus 2A carries out the authorization process.

However, since the authorization of the credit card, which is issued by the company B, is requested in this case, the card company apparatus 2A forwards the authorization request to the CAFIS 1.

In this case, as described later with reference to the flow charts shown in FIG. 4 and FIG. 5, the authorization result is transferred from the CAFIS 1 (step S25 shown in FIG. 4 and FIG. 6).

Therefore, in step S14, the card company apparatus 2A receives the authorization result, which has been transferred from the CAFIS 1.

After that, proceeding to step S15, the card company apparatus 2A transfers the authorization result that is received in the step S14 or authorization result that is executed by the card company apparatus 2A itself in the step S16 to the store terminal A1.

Next, with reference to the flow charts shown in FIG. 4 and FIG. 6, the process of the CAFIS 1 is explained below. Receiving the the authorization request forwarded from the card company apparatus 2A, which is one of the user's card company apparatuses, in step S21, the CAFIS 1 confirms an issuing company that issued this credit card in step S22. It is possible to confirm the issuing company from the card number. Then, in step S23, the card company apparatus 2A further forwards the authorization request to the issuing company that is confirmed in the step 22.

The card company apparatus 2B, which is one of the card issuing companies and to which the authorization is forwarded, executes the authorization process and transmits the authorization result (steps S32 and S22 shown in FIG. 5 and FIG. 6).

Therefore, in step S24, the CAFIS 1 receives the authorization result that has been transmitted from the card company apparatus 2B. Then, in the step S25, the CAFIS 1 transfers the authorization result that is received in the step S24 to the card company apparatus 2A, which is one of the user's card company apparatuses.

Next, with reference to the flow charts shown in FIG. 5 and FIG. 6, the processing of card company apparatus 2B, which is one of the card issuing companies, is explained below. In step S31, receiving the re-forwarded request from the CAFIS 1, the card company apparatus 2B executes the authorization process in accordance with this reception in step S32. Then, in step S33, the card company apparatus 2B transmits the authorization result to the CAFIS 1.

This authorization result is transferred from the CAFIS 1 to the card company apparatus 2A (the step S25), and it is further transferred from the card company apparatus 2A to the store terminal A1 (the step S15).

SUMMARY OF THE INVENTION

As described above, in the system used in the related art, each credit card company is required to create programs for determining whether or not the company has the power to authorize, forwarding and administrating forwarding electronic messages so as to receive the electronic message to be forwarded in its own system. Accordingly, heavy burden in cost and labor rests on each credit card company. Such burden is created at each card company (1) every time when an order and configuration of a credit electronic message, which is exchanged between respective credit card companies, is changed and (2) every time when the number of affiliated credit card companies is increased or decreased.

Accordingly, there is a need for providing a credit intermediary apparatus to mediate authorization for alleviating such a burden of each card issuing company.

According to an embodiment of the present invention, a credit intermediary system is provided. In the credit intermediary system, a first information processing apparatus transmits a credit electronic message including a credit card number to a second information processing apparatus. The second information processing apparatus determines an issuing credit company that issued the credit card on the basis of the credit card number included in the credit electronic message received and transmits the credit electronic message to a third information processing apparatus disposed in the issuing credit company. The third information processing apparatus executes an authorization process on the basis of the credit electronic message received and transmits a result of authorization process to the second information processing apparatus. The second information processing apparatus transmits the result of authorization process received to the first information processing apparatus.

According to another embodiment of the present invention, a credit intermediary apparatus is provided. The credit intermediary apparatus comprises a receiving unit for receiving a credit electronic message including a credit card number from one of the user's credit card company system and the affiliated store system, a credit request unit for determining an issuing credit company that issued the credit card on the basis of the credit card number included in the credit electronic message that is received by the receiving unit, outputting a credit electronic message corresponding to the credit electronic message to the issuing credit company system for requesting an authorization, and a transmitting unit for receiving a result of authorization process with regards to the authorization requested by the credit request unit from the issuing credit company system, and transmitting the result of authorization process to one of the user's credit card company system and the affiliated store system.

The credit electronic message may include at least one of a card holder's attribution (user attribution) information or a security code of the credit card.

The user attribution information may include at least one of information with respect to a birth date of a card holder of the credit card, information with respect to a telephone number of the card holder, information with respect to a last name of the card holder and information with respect to a first name of the card holder.

According to another embodiment of the present invention, a credit intermediary method is provided. The credit intermediary method comprises a receiving step for receiving a credit electronic message including a credit card number from one of a user's credit card company system and a affiliated store system, a credit requesting step for determining an issuing credit company that issued the credit card on the basis of the credit card number included in the credit electronic message that is received in the receiving step, outputting a credit electronic message corresponding to the credit electronic message to the issuing credit company system for requesting an authorization, and a transmitting step for receiving a result of authorization process with regards to the authorization requested in the credit request step from the issuing credit company system, and transmitting the result of authorization process to one of the user's credit card company system and the affiliated store system.

According to another embodiment of the present invention, a program or a recording medium in which the program is recorded. The program comprises a receiving step for receiving a credit electronic message including a credit card number from one of the user's credit card company system and the affiliated store system, a credit requesting step for determining an issuing credit company that issued the credit card on the basis of the credit card number included in the credit electronic message that is received in the receiving step, outputting a credit electronic message corresponding to the credit electronic message to the issuing credit company system for requesting an authorization, and a transmitting step for receiving a result of authorization process with regards to the authorization requested in the credit request step from the issuing credit company system, and transmitting the result of authorization to one of the user's credit card company system and the affiliated store system.

In the credit intermediary system according to one embodiment of the present invention, the first information processing apparatus transmits a credit electronic message including a credit card number to the second information processing apparatus. The second information processing apparatus determines an issuing credit company that issued the credit card on the basis of the credit card number included in the received credit electronic message and transmits the credit electronic message to the third information processing apparatus of the issuing credit company. The third information processing apparatus performs the authorization process on the basis of the received credit electronic message and transmits the result of credit authorization process to the second information processing apparatus. The second information processing apparatus transmits the received credit result to the first information processing apparatus. Accordingly, the present invention enables to realize a system that can alleviating burden of the credit authorization processing in a credit card issuing company.

In the credit intermediary apparatus and a method thereof, a recording medium and a program according to embodiments of the present invention, an issuing credit company that issued the credit card is determined on the basis of the credit card number included in the credit electronic message that is received from the user's credit card company system or the affiliated store system. A credit electronic message corresponding to the received credit electronic message is outputted to the issuing credit company system and a authorization process is requested. A result of the credit authorization process from the issuing credit company system is transmitted to the user's credit card company system or the affiliated store system. Accordingly, the present invention enables to alleviate burden of the credit authorization processing in a credit card issuing company which requests intermediary service of the credit authorization to the credit intermediary apparatus.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 15 is a view for showing an example of a store table;

FIG. 16 is a view for showing an example of an intermediary center database;

FIG. 17 is a view for showing an example of a card company master;

FIG. 18 is a view for showing an example of a D/e-SCOTT master;

FIG. 20 is a view for explaining a definition of a field of the electronic message shown in FIG. 19;

FIG. 21 is a view for showing an example of a matching result code;

FIG. 22 is a view for showing an example of an electronic message of the authorization;

FIG. 23 is a view for showing an example of an electronic message that the authorization is cancelled;

FIG. 24 is a flow chart for explaining other process of the credit intermediary center apparatus of the system shown in FIG. 7;

FIG. 25 is an arrow chart for explaining the processes of the affiliated store terminal, the user's card company apparatus, the credit intermediary center apparatus and the card issuing company apparatus of the system shown in FIG. 7; and FIG. 26 is an arrow chart for explaining the processes of the affiliated store terminal, the user's card company apparatus, the credit intermediary center apparatus and the card issuing company apparatus of the system shown in FIG. 7.

DESCRIPTION OF THE PREFERRED EMBODIMENTS

Figure 1:
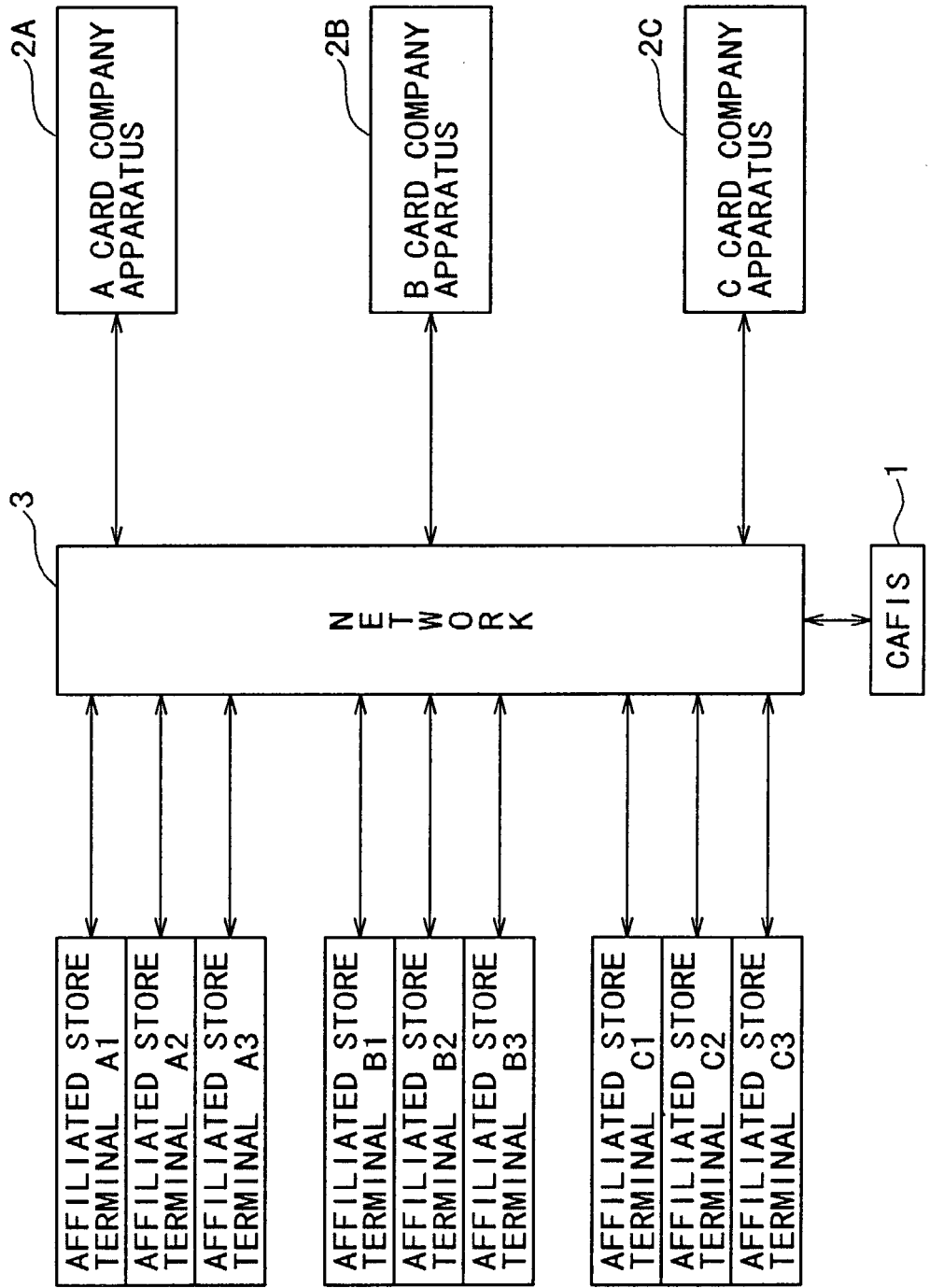
FIG. 1 is a block diagram for showing a configuration of an information processing system in related art.
Figure 2:
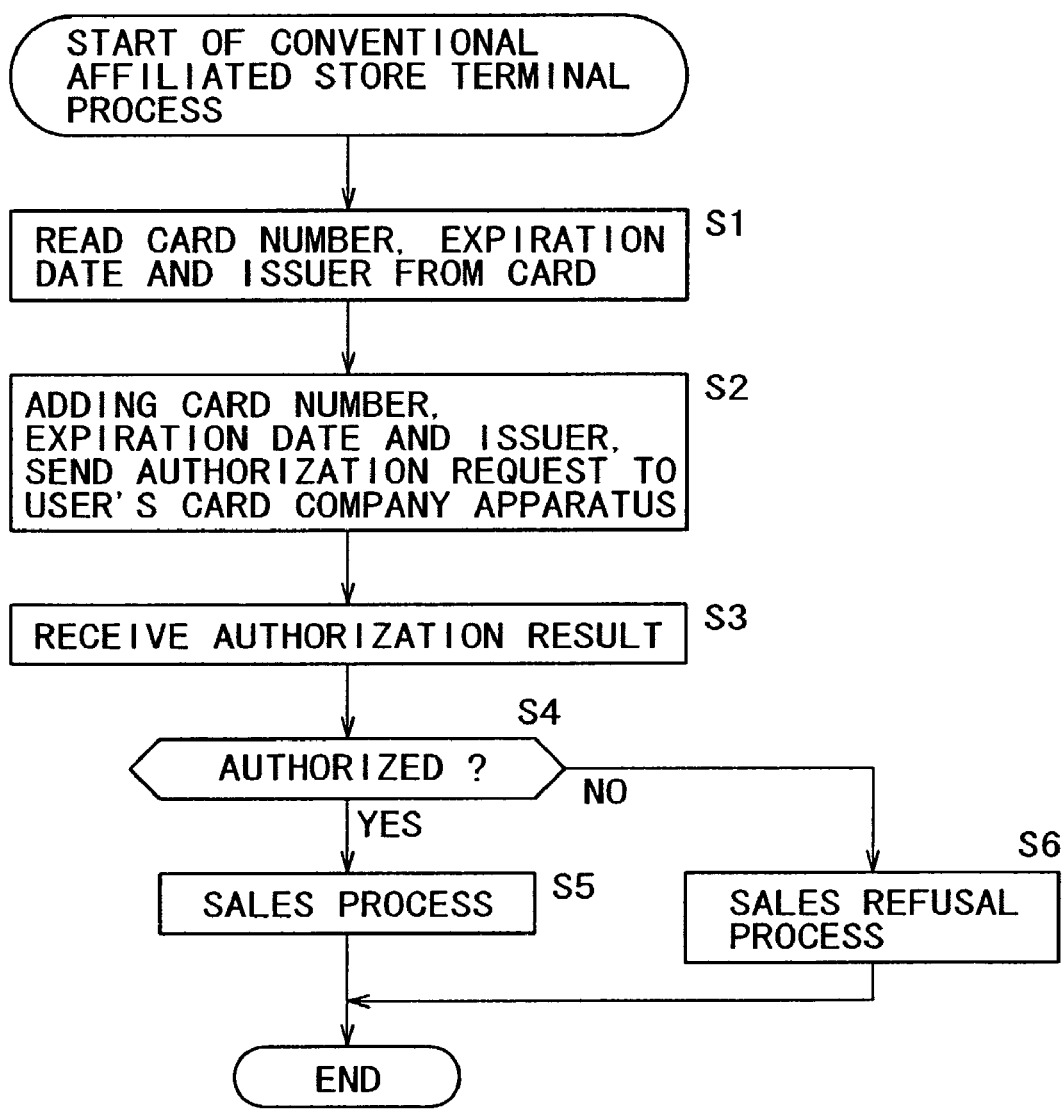
FIG. 2 is a flow chart for explaining the process of an affiliated store terminal of the system shown in FIG. 1.
Figure 3:
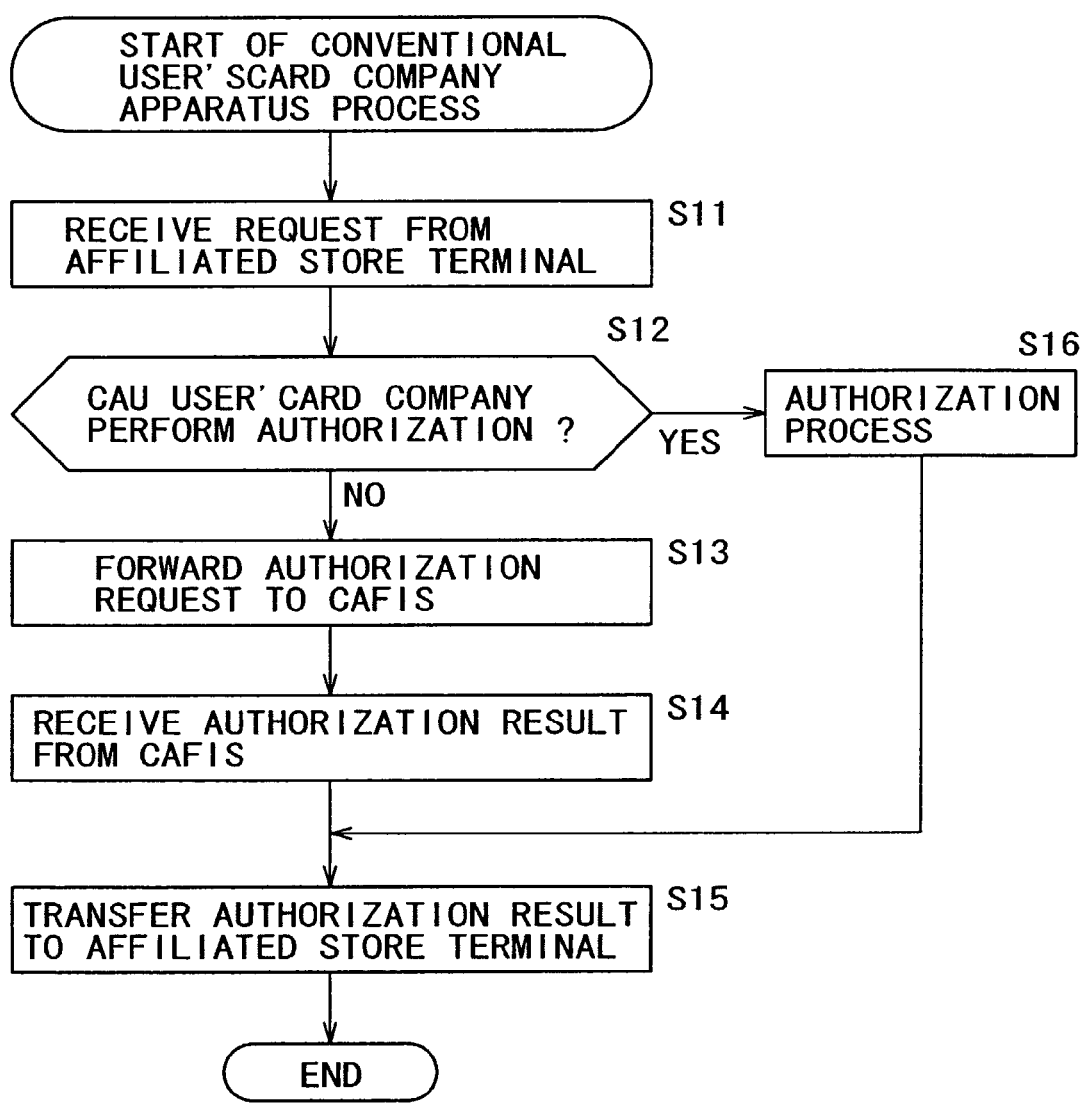
FIG. 3 is a flow chart for explaining the process of a user's card company of the system shown in FIG. 1.
Figure 4:
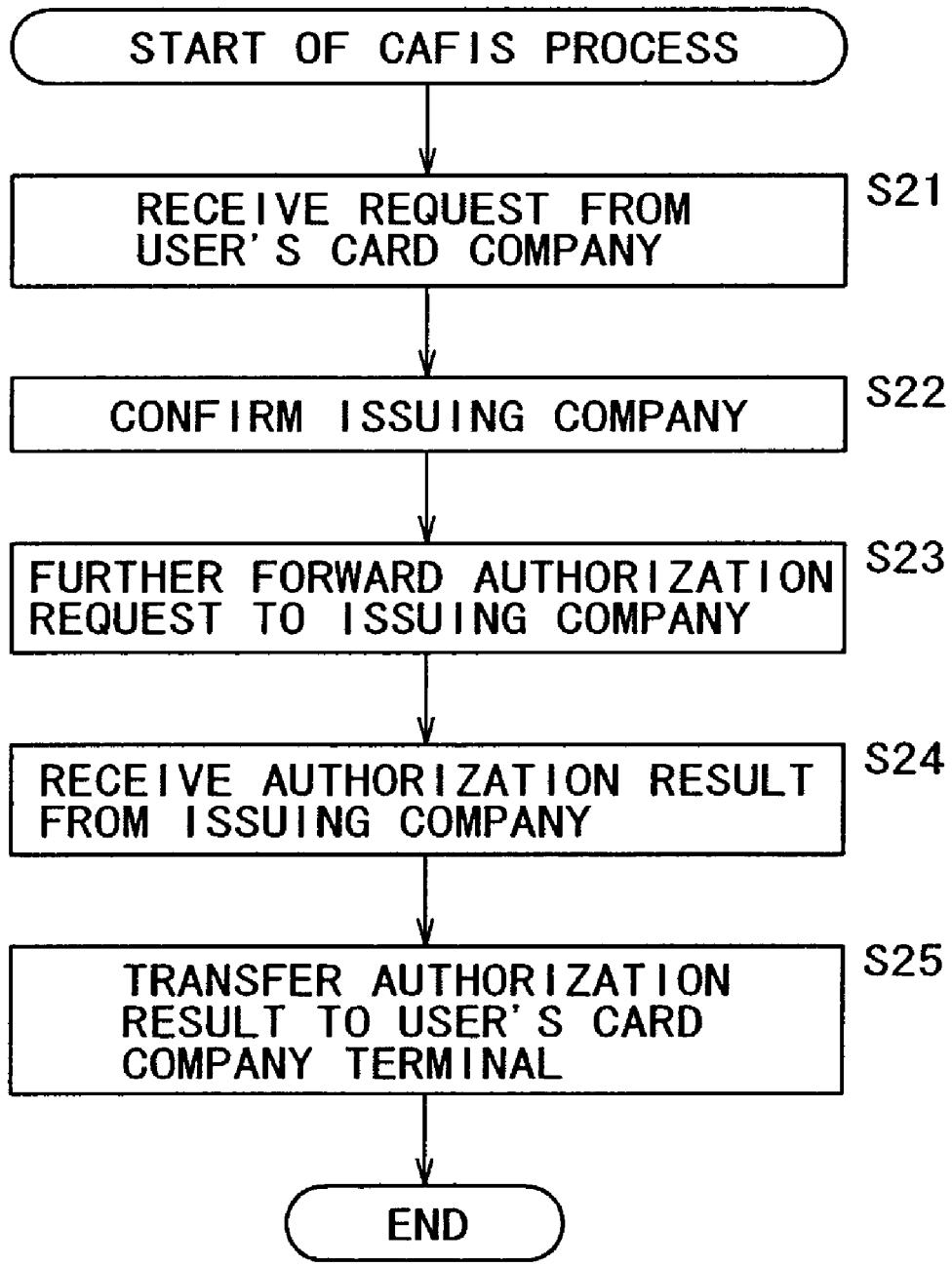
FIG. 4 is a flow chart for explaining the process of a CAFIS of the system shown in FIG. 1.
Figure 5:
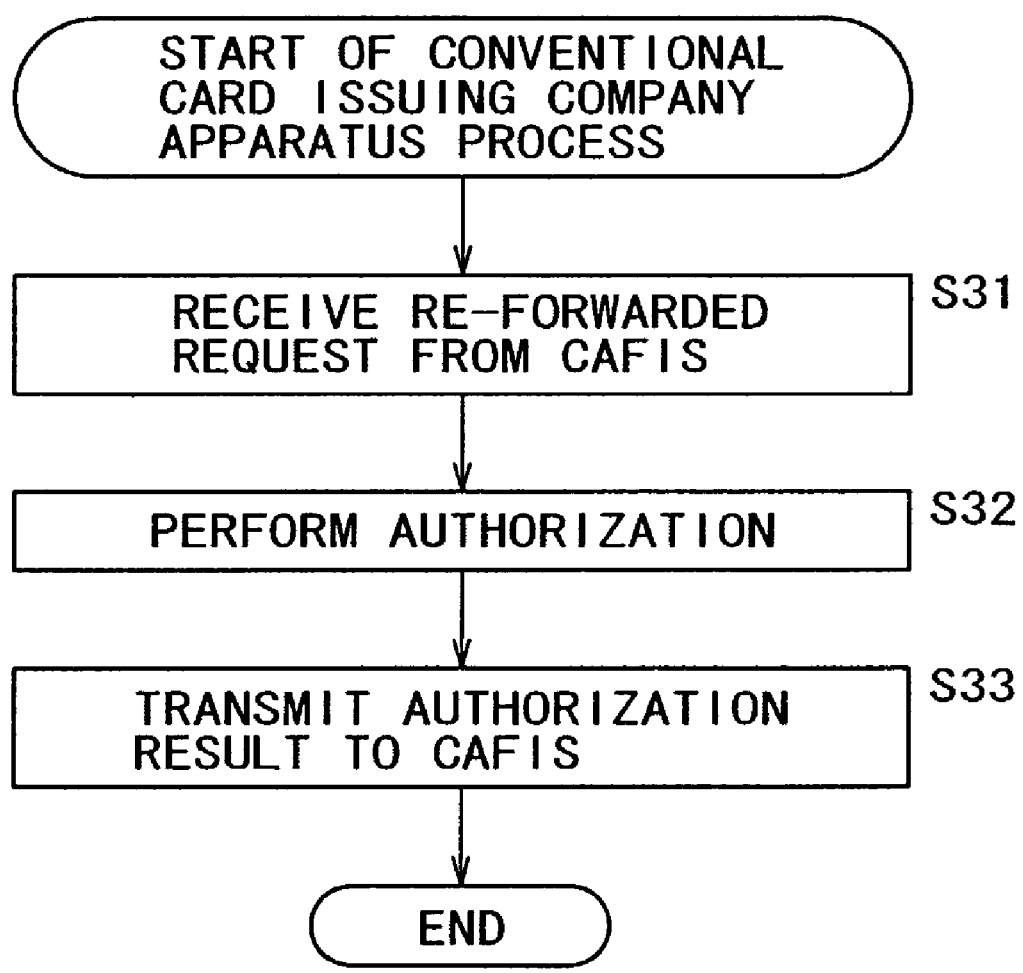
FIG. 5 is a flow chart for explaining the process of a card issuing company apparatus of the system shown in FIG. 1.
Figure 6:
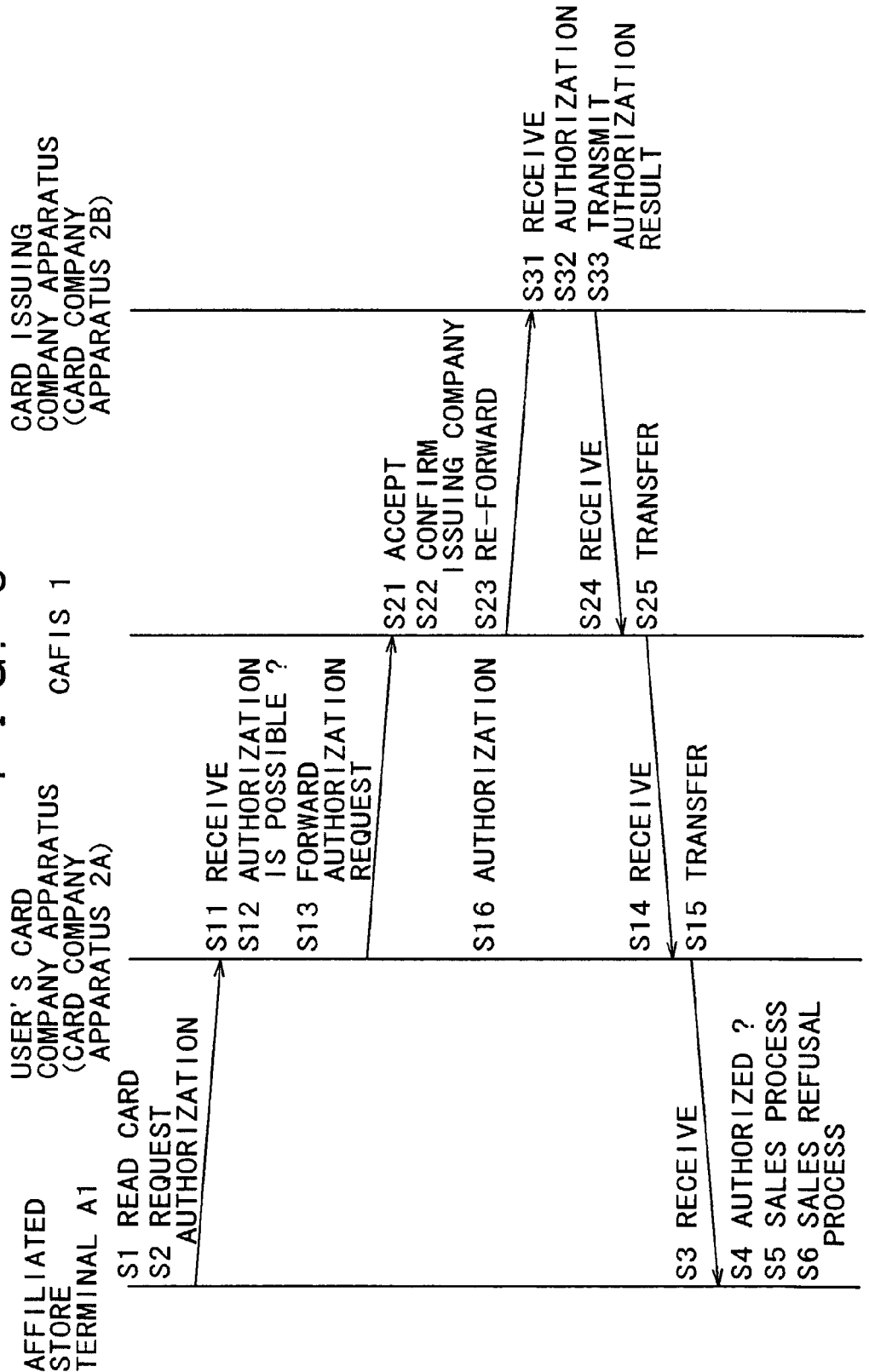
FIG. 6 is an arrow chart for explaining the process the system shown in FIG. 1.
Figure 7:
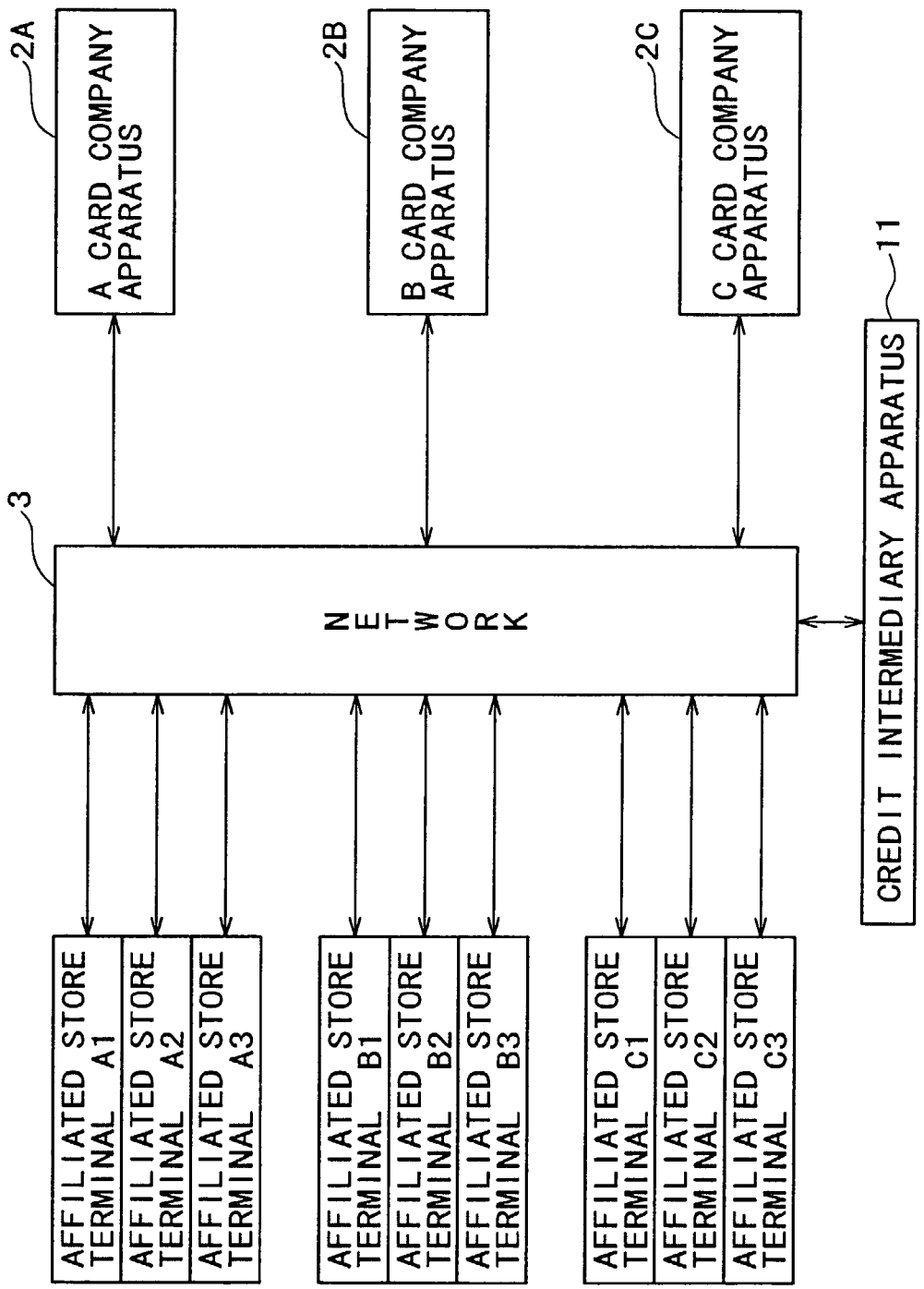
FIG. 7 is a block diagram for showing a configuration example of an information processing system, to which the present invention is applied.

FIG. 7 shows a configuration example of an information processing system, to which the present invention is applied. In FIG. 7, to the parts corresponding to FIG. 1, the corresponding reference numerals are given. According to this configuration example, the affiliated store terminals A1 to C3 constructing the affiliated store system and the card company apparatuses 2A to 2C constructing the credit card company system are also connected to the network 3 which may be Internet and/or telephone circuits. According to one embodiment of the present invention, a credit intermediary apparatus 11 is connected to this network 3.

Figure 8:
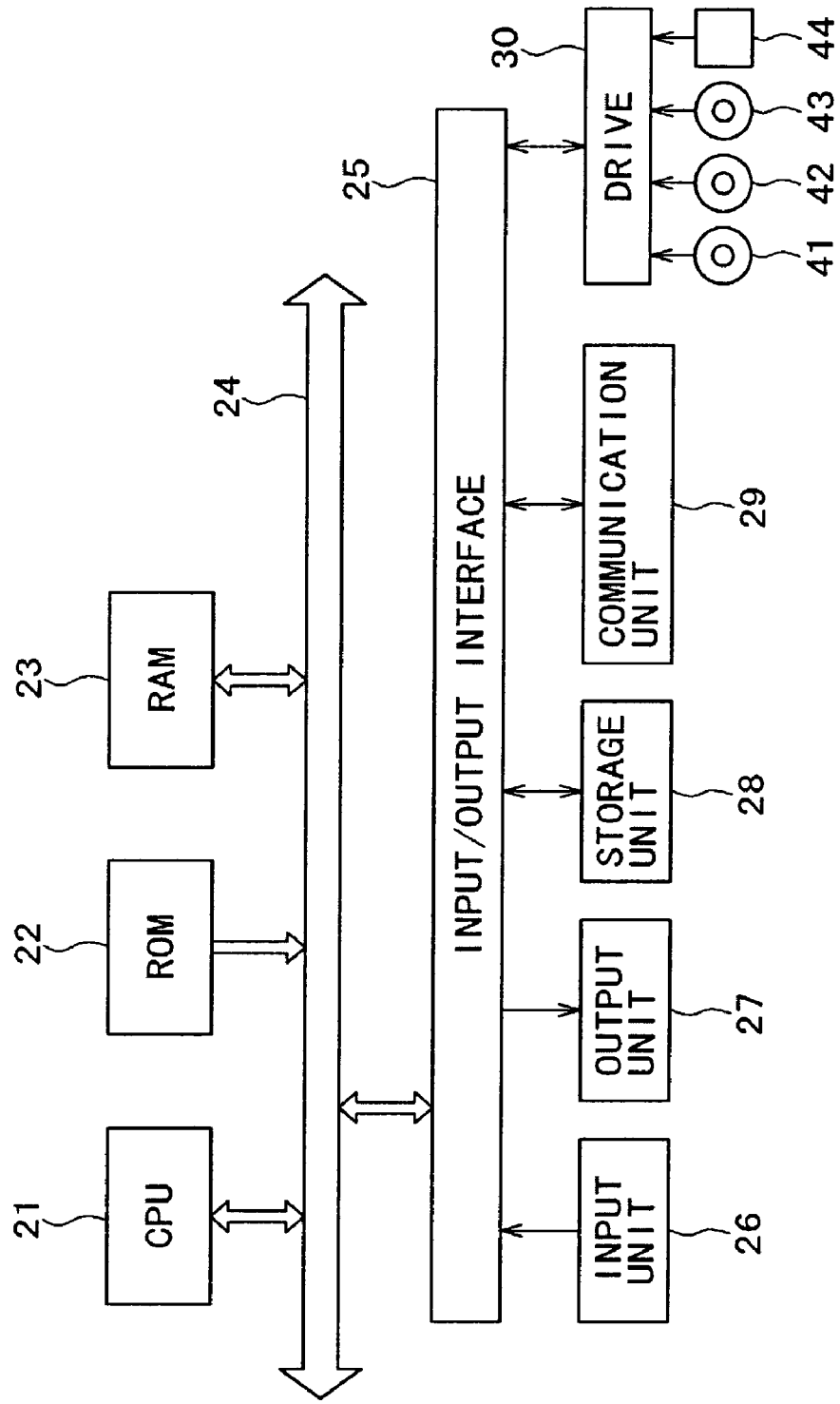
FIG. 8 is a block diagram for showing a configuration of the credit intermediary center apparatus of the system shown in FIG. 7.

FIG. 8 shows a configuration example of the credit intermediary apparatus 11.

In FIG. 8, a CPU (Central Processing Unit) 21 executes various processing in accordance with a program which is stored in a ROM (Read Only Memory) 22 or a program which is loaded in a RAM (Random Access Memory) 23 from a storage unit 28. The RAM 23 also stores appropriate data or the like, which is required for CPU 21 to execute various processing.

The CPU 21, the ROM 22 and the RAM 23 are connected with each other through a bus 24. An input/output interface 25 is also connected to this bus 24.

To the input/output interface 25, an input unit 26 consisting of a keyboard and a mouse or the like, a display consisting of a CRT and a LCD or the like, an output unit 27 consisting of a speaker or the like, the storage unit 28 consisting of a hard disk or the like and a communication unit 29 consisting of a modem and a terminal adapter or the like is connected. The communication unit 29 performs the communication processing through the network 3 including the Internet.

Depending on an application, a drive 30 is connected to the input/output interface 25 and further, a magnetic disk 41, an optical disk 42, an optical magnetic disk 43, or a semiconductor memory 44 are appropriately disposed in the input/output interface 25. Then, a computer program, which is read out from them, is installed in the storage unit 28 according to need.

Although the illustrations thereof are omitted, the affiliated store terminals A1 to C3 and the card company apparatuses 2A to 2C are constituted basically in the same way as the credit intermediary apparatus 11. FIG. 8 is also cited as one example of configuration of the affiliated store terminals A1 to C3 and the card company apparatuses 2A to 2C in the following explanation.

Figure 9:
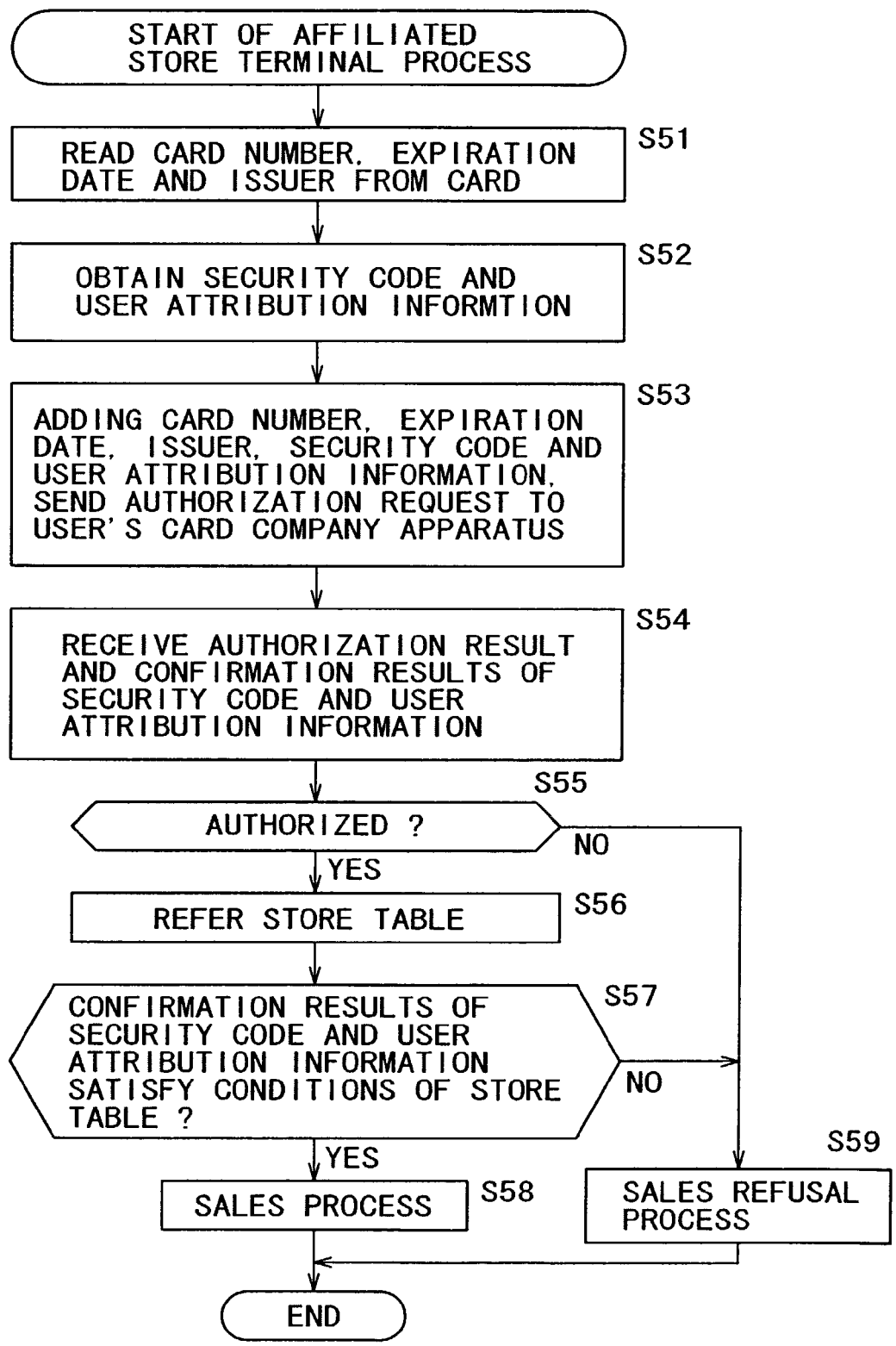
FIG. 9 is a flow chart for explaining the process of the affiliated store terminal of the system shown in FIG. 7.
Figure 10:
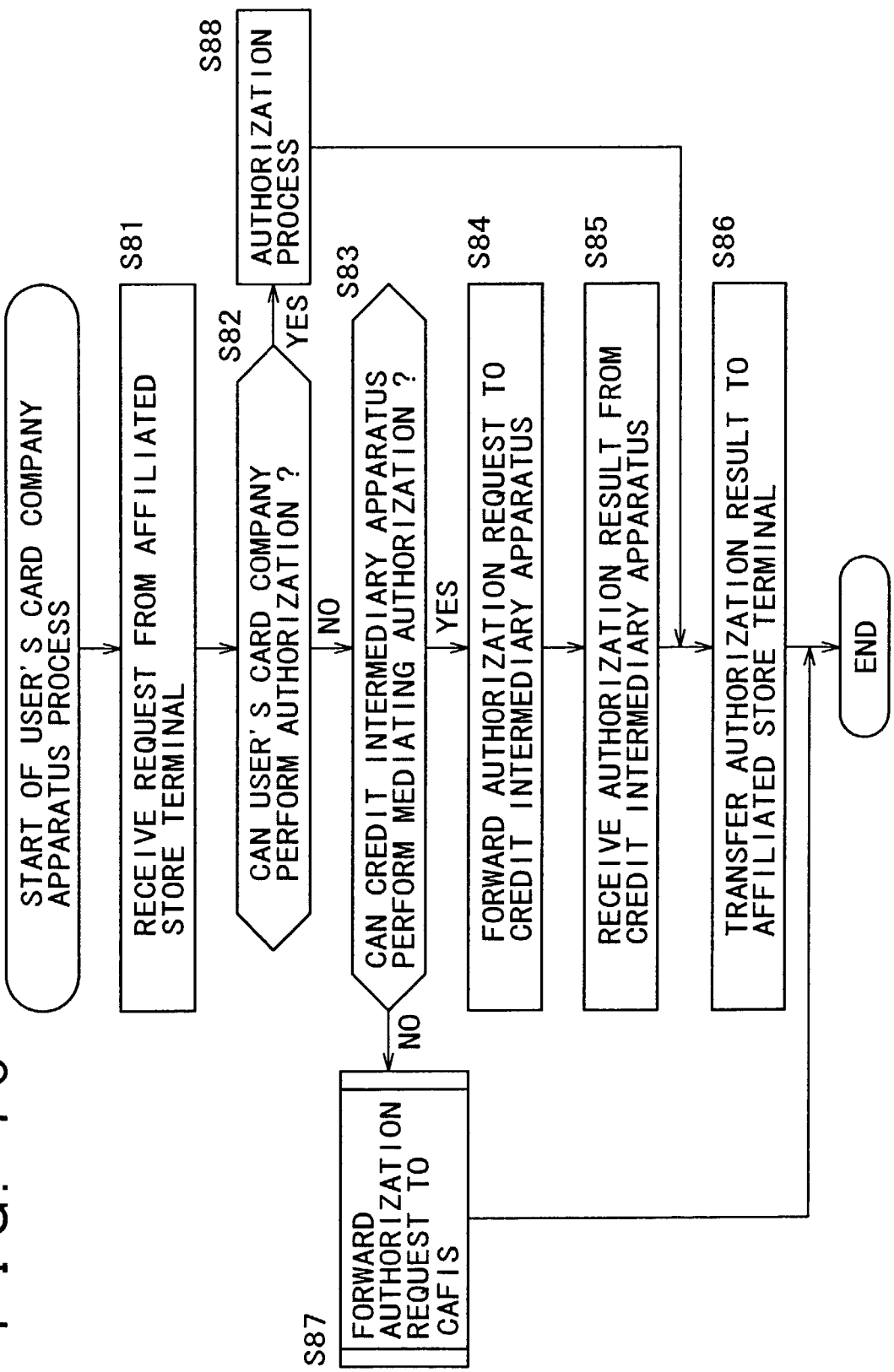
FIG. 10 is a flow chart for explaining the process of the user's card company apparatus of the system shown in FIG. 7.
Figure 11:
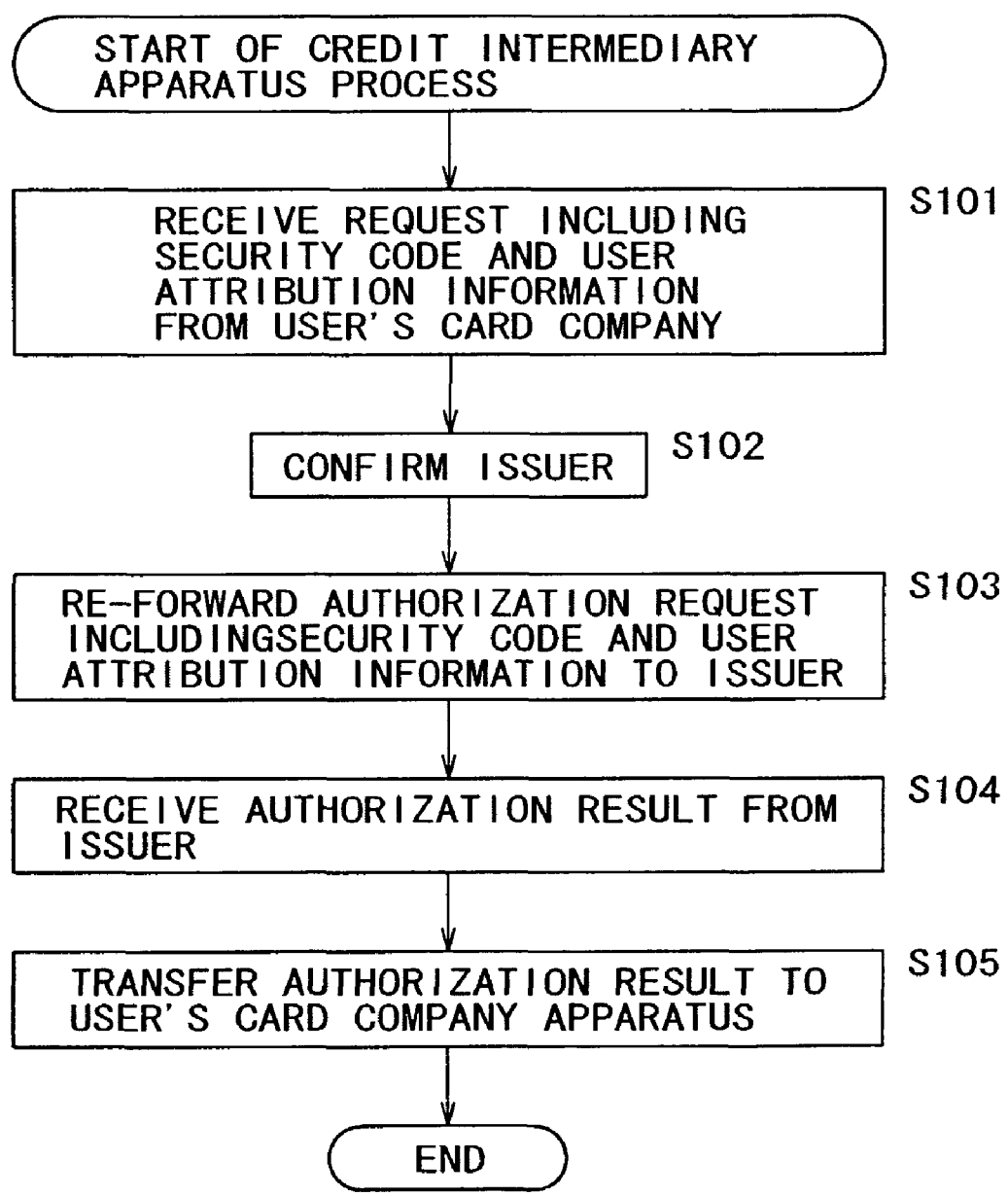
FIG. 11 is a flow chart for explaining the process of the credit intermediary center apparatus of the system shown in FIG. 7.
Figure 12:
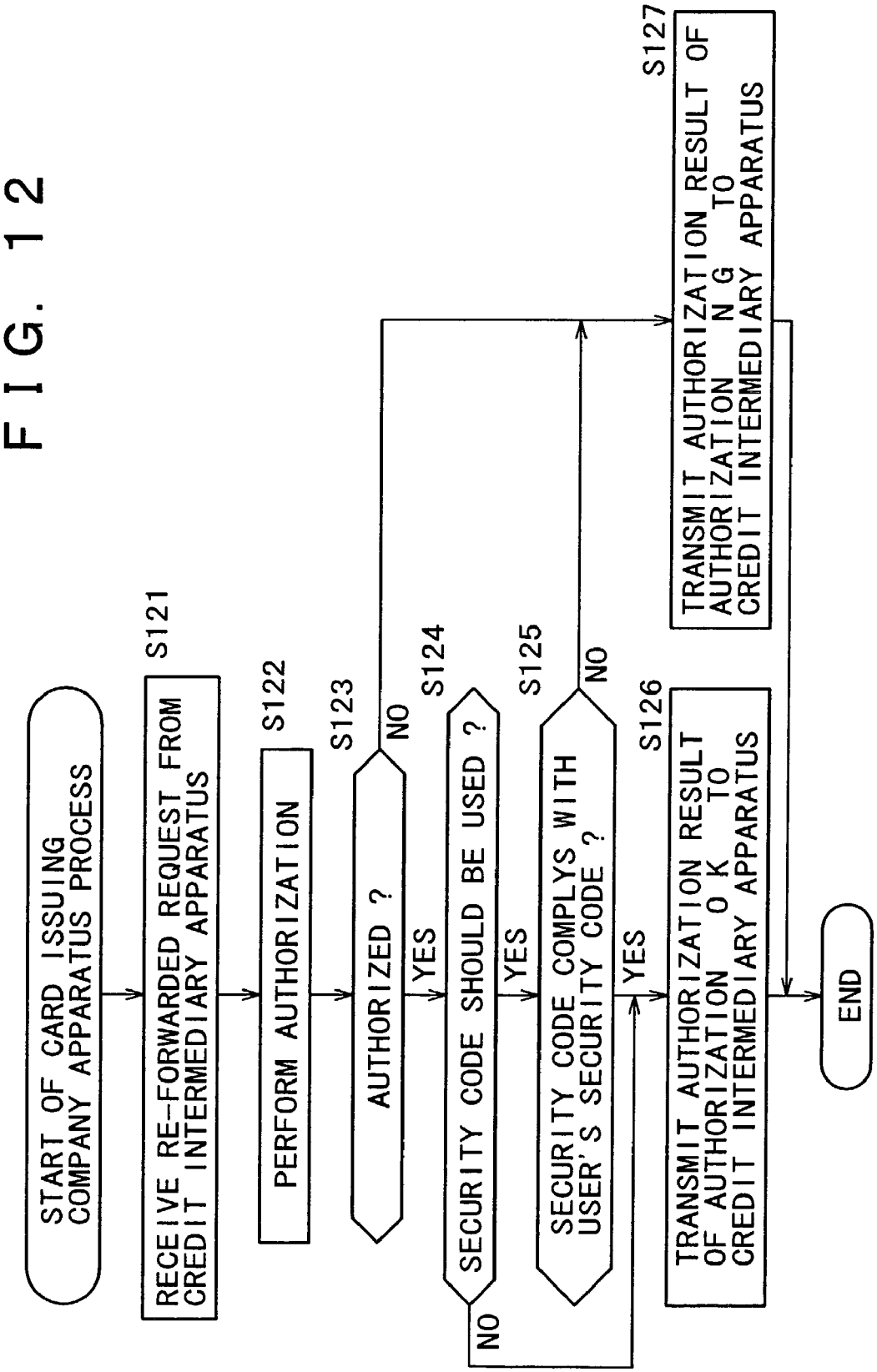
FIG. 12 is a flow chart for explaining the process of the card issuing company apparatus of the system shown in FIG. 7.
Figure 13:
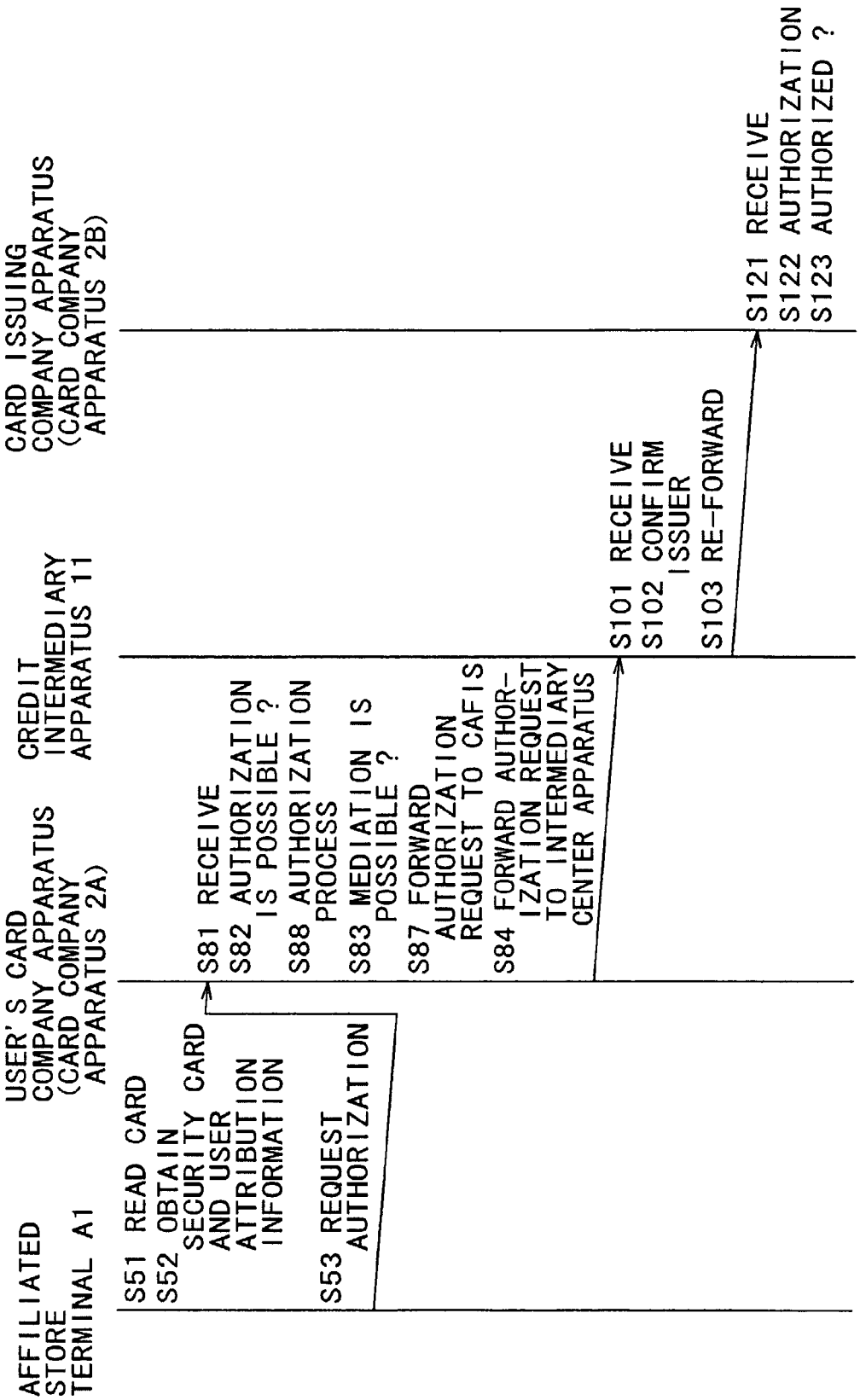
FIG. 13 is an arrow chart for explaining the processes of the affiliated store terminal, the user's card company apparatus, the credit intermediary center apparatus and the card issuing company apparatus of the system shown in FIG. 7.
Figure 14:
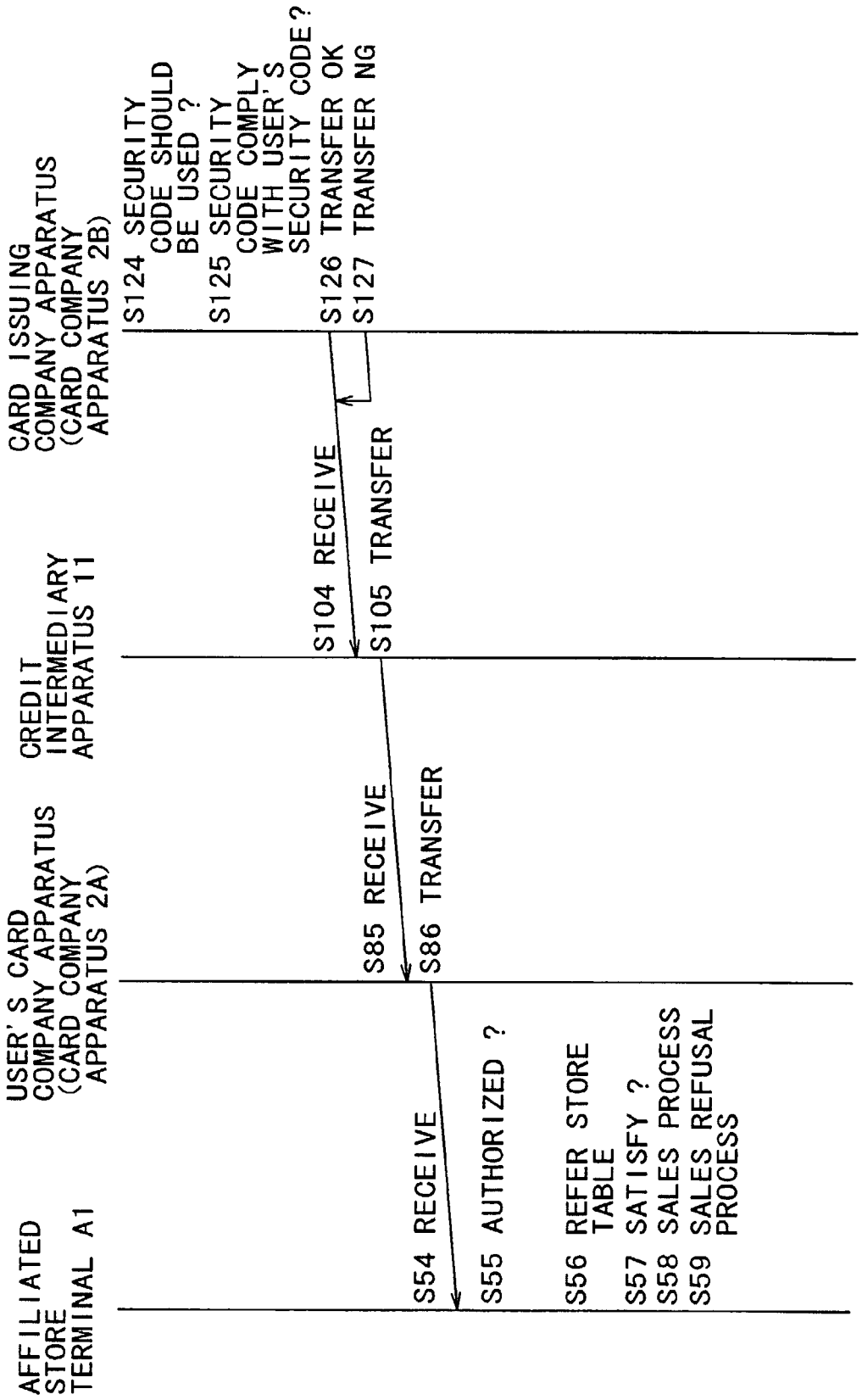
FIG. 14 is an arrow chart for explaining the processes of the affiliated store terminal, the user's card company apparatus, the credit intermediary center apparatus and the card issuing company apparatus of the system shown in FIG. 7.

Next, with reference to the flow charts shown in FIG. 9 to FIG. 14, the operation of the information processing system shown in FIG. 7 is described below. FIG. 9 shows processing of the affiliated store terminal included in the affiliated store system, FIG. 10 shows processing of the user's card company apparatus included the user's credit card company system, FIG. 11 shows processing of the credit intermediary apparatus 11 included in the credit intermediary system, and FIG. 12 shows processing of the card issuing company apparatus included in a card issuing company system. Additionally, FIG. 13 and FIG. 14 represent relations between the processing of these affiliated store terminal, the user's card company apparatus, the credit intermediary apparatus 11 and the card issuing company apparatus.

In the following explanation, similarly as in the case used in explanation of the related art described above, it is assumed that a user uses his/her credit card, which is issued by the company B and is also capable of being used in the affiliated store terminal of the company A, at the store in which the affiliated store terminal A1 is placed.

First, with reference to FIG. 9, FIG. 13 and FIG. 14, the process of the affiliated store terminal is explained below. In step S51, the CPU 21 of the affiliated store terminal A1 controls a card reader comprising the input unit 26 so as to read out a card number, a expiration date and an issuer of a credit card from the credit card that is presented by the user. For example, the card number and the expiration date may be read out from a magnetic medium or any other recording medium disposed on the credit card. The issuer (the card issuing company) is read as the upper six figures of the card numbers.

Alternatively, in the following explanation, the information with respect to these card number, expiration date and issuer are referred as card information according to need.

Next, in step S52, the CPU 21 of the affiliated store terminal A1 obtains a security code and user attribution information. The security code comprises four or three figures, which are described following the card number. Such security code may be, for example, indicated on a signature column by printing. These figures are inputted manually by an administrator of the affiliated store terminal A1, for example, with the use of a numeric-key included in the input unit 26 or by optically reading thereof.

In the instant example, the user attribution information comprises all or at least one of the month and the day except for the year of the user's date of birth, the lower four figures of the user's home telephone number, the last name of the user's name in katakana and the first name of the user's name in katakana.

Needless to say, as the information with regard to the date of birth, the year may be further used in addition to the month and the day. In this case, the year may be represented as the four figures in a dominical year or the lower two figures in a dominical year.

The user attribution information is inputted by the administrator of the affiliated store terminal A1 or the user by operating the input unit 26 on the basis of user's declaration.

In step S53, the CPU 21 sends an authorization request to the card company apparatus 2A, which is one of the user's card company apparatuses. In this case, the card number, the expiration date and the issuer that are read in the processing in the step S51 and the security code and the user attribution information that are obtained in the processing in the step S52 are added to the authorization request.

When the authorization request is instructed, the CPU 21 controls the communication unit 29 so as to transmit the authorization request to the card company apparatus 2A via the network 3.

As described later, Such a authorization request is transferred to the credit intermediary apparatus 11 from the card company apparatus 2A (step S84 shown in FIG. 10 and FIG. 13) and then, it is further transferred to the card company apparatus 2B from the credit intermediary apparatus 11 (step S103 shown in FIG. 11 and FIG. 13). Then, the authorization result is transmitted to the credit intermediary apparatus 11 from the card company apparatus 2B (steps S126, S127 shown in FIG. 12 and FIG. 14). After that, this authorization result is transferred to the card company apparatus 2A from the credit intermediary apparatus 11 (step S105 shown in FIG. 11 and FIG. 14) and further, it is transferred to the affiliated store terminal A1 from the card company apparatus 2A (step S86 shown in FIG. 10 and FIG. 14).

Therefore, in the step S54, the CPU 21 receives the authorization result that is transferred from the card company apparatus 2A. In this case, the confirmation results of the security code and the user attribution information are also transmitted together with the authorization result and these confirmation results are received in conjunction with the authorization result.

In the step S55, the CPU 21 determines whether or not the authorization result received in the process of the step 54 indicates that the user's credit card has been authorized (authorization OK). If the result shows the authorization OK, the process proceeds to step S56 and the CPU 21 refers, for example, a store table which is stored in the storage unit 28 as shown in FIG. 15.

As shown in FIG. 15, in this store table, the confirmation results of the security code and the user attribution information and terms of use are defined. According to the example shown in FIG. 15, in a case that the purchase amount is a hundred thousand yen or more, and all of the date of birth, the telephone number, the last name in katakana, the first name in katakana and the security code are confirmed, the use of the credit card is allowed. In a case that the purchase amount is ten thousand yen or more (but less than one hundred thousand yen), it is needed to confirm the date of birth, the last name in katakana and the security code. In a case that the purchase amount is two thousand yen or more (but less than ten thousand yen), it is only needed to confirm the date of birth. In a case that the purchase amount is less than two thousand yen, the use of the credit card is allowed without confirming any of the user attribution information and the security code.

As described above, the authorization result obtained in the step S54 includes these confirmation results of the security code and the user attribution information. Therefore, in step S57, the CPU 21 compares these confirmation results with the store table that is referred to in the step S56, so that the CPU 21 determines whether or not the confirmation results satisfy the conditions defined in the store table.

If the conditions are satisfied, the process proceeds to step S58 and the CPU 21 executes a sales process. In other words, the administrator of the affiliated store terminal A1 inputs an instruction necessary for complete sale transaction of the purchased amount by the use of the credit card by operating the input unit 26. Then, the commodity sold by the use of the credit card may be handed to the user, or any other procedures required to complete the sales may be performed.

On the other hand, in a case that the authorization result does not indicate the authorization OK in the step S55 (namely, in the case that the authorization result is determined as the authorization NG). and in a case that the security code and the user attribution information are determined as not to satisfy the conditions defined in the store table in the step S57, the process proceeds to step S59 and the CPU 21 executes a sales refusal process. In other words, in this case, the administrator of the affiliated store terminal A1 refuses the sales of the commodity because the authorization result is NG or even if the authorization result is OK, the conditions defined in the store table are not satisfied (for example, the date of birth presented by the user does not match to the registered date of birth when the purchase amount is one hundred thousand yen or more). Accordingly, in this case, the user cannot purchase the commodity by using the credit card.

Each store is capable of deciding the conditions of the store table shown in FIG. 15 uniquely. For example, it is necessary that all of five conditions are satisfied in the case of the purchase of one hundred thousand yen or more by the use of the credit card in the store of the affiliated store terminal A1. However, in the affiliated store terminal A2, the conditions may be redefined to relax the required condition in such a way, for example, that the purchase of one hundred thousand yen or more is allowed even if only three out of five conditions are satisfied.

Next, with reference to FIG. 10, FIG. 13 and FIG. 14, process of the card company apparatus 2A, which is one of the user's card company apparatuses, to be executed in accordance with the above-mentioned process of the affiliated store terminal A1 is explained below.

In step S81, receiving the authorization request from the affiliated store terminal A1 (i.e., the request outputted in the process of the step S53), the CPU 21 of the card company apparatus 2A determines whether or not the card company A can authorize the use of the user's credit card by itself. Specifically, it is determined whether or not the user's credit card has been issued by the card company A. As explained with reference to FIG. 9, the issuer of the credit card is read (the step S51) and transferred together with the authorization request. Therefore, by determining whether or not the issuer information of the credit card accompanied by the authorization request (i.e., the upper six figures of the card number) indicates a value representing the card company A itself, it becomes possible to determine whether or not the authorization can be executed.

In the case that the authorization can be executed (namely, in the case that the card company A itself issues the user's credit card, of which authorization is requested), the process proceeds to step S88 and the CPU 21 executes the authorization process. The information necessary for the authorization process has been stored in a database of the storage unit 28 in advance.

On the other hand, in step S82, in the case that it is determined that the card company A itself cannot execute the authorization (in the case that other company issues the user's credit card), the process proceeds to step S83 and the CPU 21 determines whether or not it is possible to request mediation of the authorization request to the credit intermediary apparatus 11. In order to use the credit intermediary apparatus 11, it is necessary for each card company to register oneself in the credit intermediary apparatus 11. In the case that this registration has been already finished, it becomes possible to mediate the authorization request to the credit intermediary apparatus 11. On the other hand, in the case that the issuer oneself has not been registered in the credit intermediary apparatus 11 yet, it is not possible to mediate the authorization request to the credit intermediary apparatus 11. In this case, the process proceeds to step S87 and the CPU 21 carries out the process of forwarding the authorization request to the CAFIS. Accordingly, the process in this case is the same as the processes of the cases shown in FIG. 2 to FIG. 6.

In step 83, in the case that it is determined that the authorization request can be mediated by the credit intermediary apparatus 11, the process proceeds to step S84 and the CPU 21 carries out the process of forwarding the authorization request to the credit intermediary apparatus 11. More specifically, the CPU 21 controls the communication unit 29 and transmits the data of the authorization request to the credit intermediary apparatus 11 via the network 3.

In accordance with this process, as described later, the credit intermediary apparatus 11 further forwards the authorization request to the card company apparatus 2B, and an authorization result that has been executed by the card company apparatus 2B is transferred from the credit intermediary apparatus 11 (step S105 shown in FIG. 11 and FIG. 14).

In step S85, the CPU 21 receives the authorization result that is transmitted from the credit intermediary apparatus 11. Further, in step S86, the CPU 21 transfers the authorization result received in the step S85 or the authorization result executed by itself in the step S88 to the affiliated store terminal A1. In the step S54 shown in FIG. 9, this authorization result is received by the affiliated store terminal A1.

Next, with reference to FIG. 11, FIG. 13 and FIG. 14, the process of the credit intermediary apparatus 11 to be executed in accordance with the above-mentioned process of the card company apparatus 2A is explained. In step S101, the CPU 21 of the credit intermediary apparatus 11 receives the authorization request that is transmitted in the process of the step S84 shown in FIG. 10. This authorization request includes the security code and the user attribution information. Needless to say, it also includes the card number, the expiration date and the issuer, which are read from the user's credit card.

In step S102, the CPU 21 confirms the issuer included in the authorization request, which is received in the step S101. Then, in step S103, the CPU 21 further forwards the authorization request to the issuer that is confirmed in the process in the step S102 (in this case, the card company apparatus 2B). This authorization also includes the card number, the expiration date and the issuer in addition to the security code and the user attribution information.

The credit intermediary apparatus 11 has an intermediary center database at the storage unit 28 as shown in FIG. 16 in order to perform the above-mentioned processes. This intermediary center database consists of a card company master and a D/e-SCOTT (registered trademark) connecting company master.

As shown in FIG. 17, for example, an identification information (ID) of the issuer of the credit card and the card company name are stored in association with each other in the card company master. According to an example shown in FIG. 17, it is stored that the card company name with the issuer ID of "123456" is the company A, the card company name with the issuer ID of "555555" is the company B and the card company name with the issuer ID of "987654" is the company C, respectively.

FIG. 18 shows a configuration example of a D/e-SCOTT master. As shown in FIG. 18, in this master, for each issuer ID, IP (Internet Protocol) addresses of the card company apparatuses 2A, 2B and 2C, which are administrated respectively by each card company with each issuer ID, and the affiliated store company codes are stored in association with each other. According to this example, for example, the IP address of the card company with the issuer ID of "123456" is "211.239.101.201" and its affiliated store company code is "35210025561".

The CPU 21 identifies the card company name from the issuer ID of the card company master and reads the IP address corresponding to the issuer ID of the D/e-SCOTT master, so that the CPU 21 obtains the IP address on the network 3 of the card company apparatus of the specified card company. Hence, in this case, the CPU 21 is capable of further forwarding the authorization request to the card company apparatus 2B of the company B.

The upper six figures among the eleven figures of the affiliated store company code represent an affiliated store identification code and the lower five figures thereof represent a company code, which is allocated to each company by a distribution development center (a service mark is registered). The affiliated store company code is used to identify from what merchant the electronic message is transmitted (namely, identify the affiliated store (i.e., the card issuing company) in this system).

Figure 19:
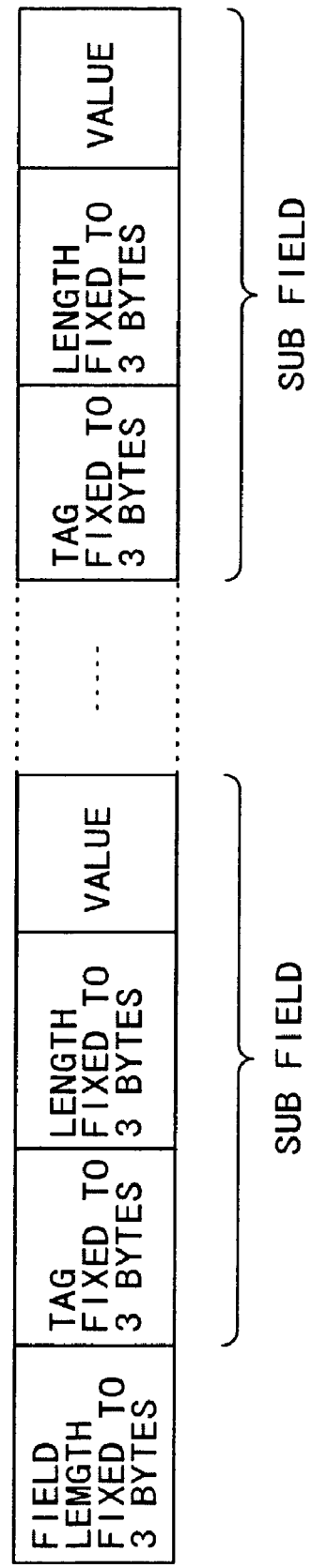
FIG. 19 is a view for showing a format of an electronic message.

FIG. 19 shows a format of an electronic message to be transmitted and received between the credit intermediary apparatus 11 and the card company apparatuses 2A, 2B and 2C. As shown in FIG. 19, at a head thereof, the data of three bytes representing a field length of the electronic message is stored and after that, the required numbers of sub fields are added. The sub field consists of a tag field of three bytes, a length field of three bytes and a necessary value field. Further, the number of the sub field may be decided arbitrarily.

FIG. 20 shows a more detailed configuration of one sub field. According to this example, a value of S01 is stored in the tag field and a value of 46 is stored in the length field. In the value field, the security code, the date of birth and the home telephone number are represented by four figures, respectively and the last name in katakana and the first name in katakana are represented by the fifteen letters, respectively.

Then, each matching result code of the date of birth, the home telephone number, the last name in katakana and the first name in katakana is represented as one figure.

FIG. 21 shows an example of a matching result code. The value of "0" represents matching, namely, represents that the value of the item is matched to the inputted content, the value of "1" represents un-matching, namely, represents that the value of the item is not matched to the inputted content and the value of "8" represents that matching is not applicable, namely, represents that matching of the value of the item is not performed because a space is not set therein. Additionally, the value of "9" represents that matching is not available, namely, represents that it is not possible to match because the card is an affiliated credit card, a corporate card and other company's card or the like or that it is a matching unavailable card.

The initial value of the security code to the matching result code shown in FIG. 20 is defined as a space.

As described above, if the credit intermediary apparatus 11 further forwards the authorization request to the card company apparatus 2B, as described later, the card company apparatus 2B transmits the authorization result (steps S126 and S127 shown in FIG. 12 and FIG. 14).

Then, in the step S104, the CPU 21 of the credit intermediary apparatus 11 receives the authorization result, which has been transmitted from the card company apparatus 2B.

FIG. 22 shows an example of an electronic message, which is transferred to the card company apparatus 2B from the credit intermediary apparatus 11 in this way and an example of an electronic message, which is returned to the credit intermediary apparatus 11 from the card company apparatus 2B in response to the transferred electronic message. According to this example, in the case that the electronic message is transmitted from the credit intermediary apparatus 11 to the card company apparatus 2B, in the items of the security code, the date of birth, the home telephone number, the last name in katakana and the first name in katakana, the corresponding values are described, respectively. However, in the case that there is no input, these items are spaced. The items in the matching results 1 to 4 (the matching results of the date of birth to the name in katakana) are spaced because the matching has not been performed yet.

On the other hand, in the electronic message to be transmitted to the credit intermediary apparatus 11 from the card company apparatus 2B, five items from the security code to the name in katakana are required to "guarantee contents of a request electronic message". In other words, in these items, the contents of the transmitted electronic message are copied as there are.

In the columns from the matching result (1) to the matching result (4), a matching result (a matching result code shown in FIG. 21) is set.

FIG. 23 shows an example in the case that the authorization is to be cancelled. In this case, all of respective items from the security code to the matching result (4) of the electronic message to be transmitted to the card company apparatus 2B from the credit intermediary apparatus 11 are spaced.

On the contrary, in the electronic message to be transmitted to the credit intermediary apparatus 11 from the card company apparatus 2B, five items from the security code to the name in katakana are regarded as identical with the content of the request electronic message, so that the matching results (1) to (4) are all spaced.

Returning to FIG. 11, if the authorization result is received from the card company apparatus 2B in the step S104 as described above, the CPU 21 transfers this authorization result to the card company apparatus 2A in the step S105.

As described above, this authorization result is further transferred from the card company apparatus 2A to the affiliated store terminal A1 (the step S86 in FIG. 10 and FIG. 14).

Next, with reference to FIG. 12 to FIG. 14, the process of the card company apparatus 2B to be performed in response to the above-mentioned process of the credit intermediary apparatus 11 is described below.

In step S121, receiving the re-forwarded authorization request, which has been transmitted in the process of the step S103, from the credit intermediary apparatus 11, the CPU 21 of the card company apparatus 2B executes the authorization process in step S122. In the database of the card company apparatus 2B, the user information of the user, to whom the credit card is issued by the company B, is stored and on the basis of this information, the card company apparatus 2B executes the authorization process of this user.

Next, in step S123, the CPU 21 determines whether or not the authorization result is the authorization OK. In the case that the authorization result is the authorization OK, the process proceeds to step S124 and the CPU 21 determines whether or not the use of the security code in the determination result of the authorization are instructed by the administrator of the card company apparatus 2B. In other words, the administrator of the card company apparatus 2B operates the input unit 26 in advance to store information regarding whether or not the security code is used for the determination of the authorization process in the storage unit 28. The CPU 21 performs this determination processing in accordance with such information stored.

In the case that the use of the security code is instructed, the process proceeds to step S125 and the CPU 21 determines whether or not the security code included in the electronic message, which was transmitted from the credit intermediary apparatus 11 and was received in the step S121, accords with the security code stored in the database as the security code of the user. In the case that both of them accord with each other, the process proceeds to step S126 and the CPU 21 generates the authorization result indicating the authorization OK and transmits it to the credit intermediary apparatus 11.

In step S124, in the case that it is determined that the use of the security code is not instructed, in step S126, the authorization result of the authorization OK is transmitted to the credit intermediary apparatus 11.

On the other hand, in step S123, in the case that the authorization result is determined as not the authorization OK (i.e., in the case that the authorization result is determined as NG) and in the case that the security code received in the step S125 does not comply with the stored security code, the process proceeds to step S127 and the CPU 21 generates the authorization result of NG and transmits it to the credit intermediary apparatus 11.

In the above-mentioned examples, the card issuing company executes the authorization process, however, the credit intermediary apparatus 11 may also execute the authorization process. FIGS. 24 to 26 show the processing examples of this case.

The process of the affiliated store terminal A1 in this case is the same as the case shown in FIG. 9 and the process of the card company apparatus 2A is the same as the case shown in FIG. 10. The process of the card company apparatus 2B is not required in this case.

An example of processing of the credit intermediary apparatus 11 is described below. In step S201, receiving the forwarded authorization request that is transmitted in the process in the step S84 from the card company apparatus 2A, the CPU 21 of the credit intermediary apparatus 11 confirms the issuer that issued the card to be authorized in step S202. Processes of the steps S201 and S202 are the same as the processes in the steps S101 and S102 shown in FIG. 11.

Hereinafter, processes of steps S203 to S208 are performed. These processes correspond to the processes that have been performed by the card company apparatus 2B as the processes of steps S122 to S127 shown in FIG. 12.

In other words, in the step S203, the CPU 21 of the credit intermediary apparatus 11 executes the authorization process on the basis of the database of the issuer confirmed in the process of the step S202. More specifically, in the case of this process, the storage unit 28 of the credit intermediary apparatus 11 stores the user information (i.e., the information necessary for the authorization processing) of users or clients of each card company in advance.

Next, in the step S204, the CPU 21 determines whether or not the authorization is OK. Then, if the authorization is OK, in the step S205, it is determined whether or not the use of the security code in the authorization process is instructed by the card company. If the use of the security code is instructed, the process proceeds to the step S206 and the CPU 21 determined whether or not the security code included in the authorization request matches to the security code of the user registered in advance. In the case that both of them are matched, the process proceeds to the step S207 and the CPU 21 generates the authorization result of the authorization OK and transmits it to the card company apparatus 2A.

In the case that it is determined that the use of the security code is not instructed in the process of the step S205, the process of the step S207 is performed and the authorization result of the authorization OK is transmitted to the card company apparatus 2A.

On the other hand, in the step S204, in the case that the authorization result is determined as not the authorization OK (i.e., in the case that the authorization result is determined as NG) and in the case that these two security codes do not accord with each other in the step S206, the process proceeds to step S208 and the CPU 21 generates the authorization result of NG and transmits it to the card company apparatus 2A.

As described above, according to this example, the card issuing company of each credit card is capable of executing the authorization process of the credit card that is issued by other company with simply processing and high reliability in the case that each credit card company forms an affiliation with other credit card company.

According to the above-mentioned explanation, in order to feed the user attribution information, a channel different from the CAFIS is employed. However, each card company apparatus or the affiliated store terminal may be connected to the credit intermediary apparatus by using the CAFIS. In this case, however, it is not possible to transmit the user attribution information under the current specification of the CAFIS, so that, in the step S103 shown in FIG. 1, the credit intermediary apparatus forwards the electronic message only consisting of the credit card number without including the user attribution information therein.

Additionally, in the above-mentioned explanation, although the credit electronic message is fed to the credit intermediary apparatus from the affiliated store terminal via the user's card company apparatus, the credit electronic message may be directly transmitted to the credit intermediary apparatus from the affiliated store terminal. In this case, in FIGS. 13, 14, 25 and 26, the affiliated store terminal serves as the affiliated terminal and the user's card company apparatus shown in these drawings. In other words, the process of the user's card company apparatus is performed by the affiliated store terminal.

The above-mentioned series of processes may be performed by a hardware, however, it also may be performed by a software. In the case of performing a series of processes by the software, a program composing this software is installed from the network and the recording medium in a computer that is built in a dedicated hard ware or in an all-purpose personal computer or the like capable of executing various functions by installing various programs.

As shown in FIG. 8, separately from the apparatus itself, this recording medium not only consists of a package media comprising the magnetic disk 41 (including a floppy disk) to be distributed to the user for offering the program to the user, in which the program is recorded, the optical disk 42 (including a CD-RM (Compact Disk-Read Only Memory), a DVD (Digital Versatile Disk)), the optical magnetic disk 43 (including a MD (Mini-Disk)), or the semiconductor memory 44, but also it consists of the ROM 22 to be offered to the user as incorporated in the apparatus itself in advance, in which the program is recorded, and a hardware included in the storage unit 28.

Alternatively, in the present specification, the steps describing the programs recorded in the recording medium include not only the processes to be performed in the described order in time series but also include the processes to be performed not necessarily in time series but in parallel or individually.

Additionally, in the present specification, a system represents an entire construction of apparatuses consisting of a plurality of apparatuses.

Although the present invention has been described in its preferred form with a certain degree of particularity, obviously many changes, combinations and variations are possible therein. It is therefore to be understood that the present invention may be practiced otherwise than as specifically described here in without departing from the scope of the present invention.

What is claimed is:

1. A credit intermediary system, comprising:
    a first, a second and a third information processing apparatus to be connected with each other through a network, wherein:

said first information processing apparatus transmits a credit electronic message including a credit card number, a plurality of a card holder's attributes independent of the credit card number and a security code of the card holder's credit card to said second information processing apparatus;

said second information processing apparatus determines an issuing credit company that issued said credit card on the basis of said credit card number, requires credit card companies to preregister with a credit intermediary database, and uses the credit intermediary database of preregistered credit card companies to transmit said credit electronic message to said third information processing apparatus disposed in said issuing credit company;

said third information processing apparatus executes a credit authorization process on the basis of said credit electronic message received, verifies each of the plurality of the card holder's attributes received, and transmits a result of credit authorization process and a confirmation result of the security code and confirmation results of the card holder's attributes indicating for each individual attribute of the plurality of the card holder's attributes whether the individual attribute matches a stored value, to said second information processing apparatus;

said second information processing apparatus transmits said result of credit authorization process and said confirmation result of the security code and the card holder's attribution information received to said first information processing apparatus;

said first information processing apparatus compares said result of credit authorization process and said confirmation result of the security code and the confirmation results of the card holder's attributes against a selected condition specifying which card holder's attributes need to be confirmed to determine whether a sales process is to be allowed or disallowed; and said first information processing apparatus includes
  a receiver that receives said result of credit authorization process and said confirmation results of the card holder's attributes and said security code of said credit card from one of said user's credit card company system or said credit intermediary system;
  a store table which is stored in a storage device, defining a plurality of conditions for one card holder corresponding to increasing transaction amount thresholds under which a sales process is approved, said first information processing apparatus selecting one condition of the plurality of conditions based on a transaction amount;
  a comparing unit that compares said result of credit authorization process and said confirmation results of the card holder's attributes and said security code of said credit card against the selected condition stored in the store table;
  a computation unit that determines whether or not said result of credit authorization process and said confirmation results of the card holder's attributes and said security code of said credit card satisfy the selected condition; and
  an execution unit that executes a sales process if the selected condition is satisfied.

2. The credit intermediary system according to claim 1, wherein:
  said card holder's attributes include a birth date of a card holder of said credit card, a telephone number of said card holder, a last name of said card holder and a first name of said card holder.

3. The credit intermediary system according to claim 1, wherein
  a first condition corresponding to a first transaction threshold requires verification of no card holder's attribution information,
  a second condition corresponding to a second transaction threshold greater than the first transaction threshold requires verification of the birth date of the card holder,
  a third condition corresponding to a third transaction threshold greater than the second transaction threshold requires verification of the birth date of the card holder, the last name of the card holder, and the security code of the card holder, and
  a fourth condition corresponding to a fourth transaction threshold greater than the third transaction threshold requires verification of the birth date of the card holder, the telephone number of the card holder, the last name of the card holder, the first name of the card holder and the security code of the card holder.

4. A credit intermediary system for performing credit-intermediacy process between an issuing credit company system and one of a user's credit card company system or an affiliated store system, said credit intermediary system comprising:
  receiving means for receiving a credit electronic message regarding a credit card including a credit card number, a plurality of a card holder's attributes independent of the credit card number and a security code of said credit card from one of said user's credit card company system or said affiliated store system;
  credit request means for determining an issuing credit company that issued said credit card on the basis of said credit card number, requiring credit card companies to preregister with a credit intermediary system database, and using the credit intermediary database of preregistered credit card companies to output a credit electronic message corresponding to the received credit electronic message to said issuing credit company system for performing a credit authorization request;
  transmitting means for receiving a result of credit authorization process and a confirmation result of the security code and confirmation results of the card holder's attributes indicating for each individual attribute of the plurality of the card holder's attributes whether the individual attribute matches a stored value, with regards to said credit authorization requested by said credit request means from said issuing credit company system, and transmitting said result of credit authorization process and said confirmation result of the security code and the confirmation results of the card holder's attributes to one of said user's credit card company system or said affiliated store system;
  receiving means for receiving said result of credit authorization process and said confirmation results of the card holder's attributes and said security code of said credit card from one of said user's credit card company system or said credit intermediary system;
  defining means for defining a plurality of conditions for one card holder corresponding to increasing transaction amount thresholds under which a sales process is approved, one condition of the plurality of conditions being selected;

storage means for storing said conditions in a store table;

comparing means for comparing said result of credit authorization process and said confirmation results of the card holder's attributes and said security code of said credit card with the selected condition specifying which card holder's attributes need to be confirmed;

determining means for determining whether or not the result of credit authorization process and the confirmation results of the card holder's attributes and said security code of said credit card satisfy the selected condition; and executing means for executing the sales process if the conditions are satisfied.

5. The credit intermediary system according to claim 4, wherein:

said card holder's attributes include a birth date of a card holder of said credit card, a telephone number of said card holder, a last name of said card holder and a first name of said card holder.

6. A credit intermediary method of a credit intermediary apparatus for performing credit-intermediacy process between an issuing credit company system and one of a user's credit card company system or an affiliated store system, said credit intermediary method comprising:

receiving a credit electronic message regarding a credit card including a credit card number, a plurality of a card holder's attributes independent of the credit card number and a security code of said credit card from one of said user's credit card company system or said affiliated store system;

determining an issuing credit company that issued said credit card on the basis of said credit card number included in said credit electronic message that is received in the receiving a credit electronic message;

outputting a credit electronic message corresponding to the received credit electronic message;

requiring credit card companies to preregister with a credit intermediary database;

using the credit intermediary database of preregistered credit card companies to transmit the outputted credit electronic message to said issuing credit company system for requesting a credit authorization;

receiving a result of credit authorization process and a confirmation result of the security code and confirmation results of the card holder's attributes indicating for each individual attribute of the plurality of the card holder's attributes whether the individual attribute matches a stored value, from said issuing credit company system;

transmitting said result of credit authorization process and the confirmation result of the security code and the confirmation results of the card holder's attributes to one of said user's credit card company system or said affiliated store system;

receiving said result of credit authorization process and the confirmation results of the card holder's attributes and said security code of said credit card from one of said user's credit card company system or a credit intermediary system;

defining a plurality of conditions for one card holder corresponding to increasing transaction amount thresholds under which a sale process is approved;

storing said conditions in a store table;

selecting one condition of the plurality of conditions;

comparing said result of credit authorization process and said confirmation results of the card holder's attributes and said security code of said credit card with the selected condition specifying which card holder's attributes need to be confirmed;

determining whether or not the result of credit authorization process and said confirmation results of the card holder's attributes and said security code of said credit card satisfy the selected condition; and executing a sales process if the selected condition is satisfied.

7. The credit intermediary method according to claim 6, wherein:

said card holder's attributes include a birth date of a card holder of said credit card, a telephone number of said card holder, a last name of said card holder and a first name of said card holder.

8. A recording medium in which a computer-readable program for realizing a credit intermediary apparatus is recorded, said computer-readable program performing credit-intermediacy process regarding a credit card, between an issuing credit company system and one of a user's credit card company system and an affiliated store system, said computer readable program comprising:

receiving a credit electronic message including a credit card number, a plurality of a card holder's attributes independent of the credit card number and a security code of said credit card from one of said user's credit card company system or said affiliated store system;

determining an issuing credit company that issued said credit card on the basis of said credit card number included in said credit electronic message that is received in the receiving a credit electronic message;

outputting a credit electronic message corresponding to the received credit electronic message;

requiring credit card companies to preregister with a credit intermediary database;

using the credit intermediary database of preregistered credit card companies to transmit the outputted credit electronic message to said issuing credit company system for requesting a credit authorization;

receiving a result of credit authorization process and a confirmation result of the security code and confirmation results of the card holder's attributes indicating for each individual attribute of the plurality of the card holder's attributes whether the individual attribute matches a stored value, from said issuing credit company system;

transmitting said result of credit authorization process and said confirmation result of the security code and the confirmation results of the card holder's attributes to one of said user's credit card company system or said affiliated store system;

receiving said result of credit authorization process and the confirmation results of the card holder's attributes and said security code of said credit card from one of said user's credit card company system or a credit intermediary system;

defining a plurality of conditions for one card holder corresponding to increasing transaction amount thresholds under which a sale process is approved;

storing said conditions in a store table;

selecting one condition of the plurality of conditions;

comparing said result of credit authorization process and said confirmation results of the card holder's attributes and said security code of said credit card with the selected condition specifying which card holder's attributes need to be confirmed;

determining whether or not the result of credit authorization process and said confirmation results of the card holder's attributes and said security code of said credit card satisfy the selected condition; and executing a sales process if the selected condition is satisfied.

9. The recording medium according to claim 8, wherein:
said card holder's attributes include a birth date of a card holder of said credit card, a telephone number of said card holder, a last name of said card holder and a first name of said card holder.

* * * * *